US012654278B2

(12) United States Patent
Watanabe et al.

(10) Patent No.: US 12,654,278 B2
(45) Date of Patent: Jun. 16, 2026

(54) POLISHING METHOD, POLISHING MONITORING METHOD AND POLISHING MONITORING APPARATUS FOR WORKPIECE

(71) Applicant: EBARA CORPORATION, Tokyo (JP)

(72) Inventors: Yuki Watanabe, Tokyo (JP); Yoichi Shiokawa, Tokyo (JP); Yasumasa Hiroo, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1172 days.

(21) Appl. No.: 17/524,144

(22) Filed: Nov. 11, 2021

(65) Prior Publication Data

US 2022/0176513 A1 Jun. 9, 2022

(30) Foreign Application Priority Data

Nov. 24, 2020 (JP) ................................. 2020-194067
Dec. 3, 2020 (JP) ................................. 2020-200761

(51) Int. Cl.
B24B 37/013 (2012.01)
B24B 37/005 (2012.01)
(Continued)

(52) U.S. Cl.
CPC .......... B24B 37/013 (2013.01); B24B 37/005 (2013.01); B24B 37/042 (2013.01);
(Continued)

(58) Field of Classification Search
CPC ..... B24B 37/013; B24B 37/042; B24B 37/10; B24B 37/005; B24B 37/30; B24B 37/34;
(Continued)

(56) References Cited

U.S. PATENT DOCUMENTS 5,830,041 A * 11/1998 Takahashi ............. B24B 37/013
451/41
9,579,767 B2 * 2/2017 Qian ..................... B24B 37/205
(Continued)

FOREIGN PATENT DOCUMENTS

CN 105745743 A 7/2016
CN 110940279 A 3/2020
(Continued)

*Primary Examiner* — Michael A Gump
(74) *Attorney, Agent, or Firm* — BakerHostetler

(57) ABSTRACT

A polishing method capable of accurately determining a thickness of a polishing-target layer without being affected by noises is disclosed. The polishing method for polishing a polishing-target layer of a workpiece includes: rotating a polishing table supporting a polishing pad; polishing the polishing-target layer by pressing the workpiece against the polishing pad; irradiating the workpiece with light; receiving reflected light from the workpiece; measuring an intensity of the reflected light at each of wavelengths; generating a spectral waveform showing a relationship between the intensity and wavelength of the reflected light; performing a Fourier transform process on the spectral waveform to generate a frequency spectrum; moving a peak search range for the frequency spectrum according to a polishing time; determining a peak of the frequency spectrum within the peak search range; and determining a thickness of the polishing-target layer corresponding to the determined peak.

6 Claims, 21 Drawing Sheets

(51) Int. Cl.
| | |
|---|---|
| *B24B 37/04* | (2012.01) |
| *B24B 37/10* | (2012.01) |
| *B24B 49/12* | (2006.01) |
| *G01B 11/06* | (2006.01) |

(52) U.S. Cl.
CPC .............. *B24B 37/10* (2013.01); *B24B 49/12* (2013.01); *G01B 11/06* (2013.01)

(58) Field of Classification Search
CPC ....... B24B 37/02; B24B 37/04; B24B 37/205; B24B 37/20; B24B 37/07; B24B 37/105; B24B 47/12; B24B 49/12; B24B 49/02; B24B 49/00; B24B 49/04; B24B 49/05; B24B 49/03; B24B 49/10; B24B 49/045; B24B 57/02; B24B 7/228; B24B 51/00; G01B 11/06; G01N 21/25; H01L 21/67092; H10P 72/0428
USPC .................................................. 451/41, 6, 5
See application file for complete search history.

(56) References Cited

U.S. PATENT DOCUMENTS

| | | | |
|---|---|---|---|
| 2001/0039064 | A1 | 11/2001 | Ushio et al. |
| 2002/0127951 | A1* | 9/2002 | Ishikawa ............... B24B 37/013 |
| | | | 451/6 |
| 2013/0109278 | A1* | 5/2013 | Kimba .................... B24B 37/20 |
| | | | 451/5 |
| 2013/0280827 | A1* | 10/2013 | Benvegnu ............... H01L 22/26 |
| | | | 257/E21.53 |
| 2018/0130667 | A1 | 5/2018 | Kimba |
| 2018/0156604 | A1 | 6/2018 | Seo |
| 2018/0264619 | A1* | 9/2018 | Yoshida ................ B24B 37/013 |
| 2019/0193242 | A1* | 6/2019 | Takahashi ............... B24B 49/16 |
| 2019/0275632 | A1* | 9/2019 | Wiswell ................ B24B 37/013 |
| 2021/0170542 | A1* | 6/2021 | Sakashita ............ H01L 21/3212 |

FOREIGN PATENT DOCUMENTS

| | | | |
|---|---|---|---|
| CN | 111644975 | A | 9/2020 |
| JP | S60-030578 | A | 2/1985 |
| JP | H06-252113 | A | 9/1994 |
| JP | 2000-310512 | A | 11/2000 |
| JP | 2005-161418 | A | 6/2005 |
| JP | 2009-283578 | A | 12/2009 |
| JP | 2010-114327 | A | 5/2010 |
| JP | 2013-080453 | A | 5/2013 |
| JP | 2013-110390 | A | 6/2013 |
| JP | 2014-066982 | A | 4/2014 |
| JP | 2015-156503 | A | 8/2015 |
| JP | 2016-105486 | A | 6/2016 |
| JP | 2019-021748 | A | 2/2019 |
| TW | 201910051 | A | 3/2019 |

\* cited by examiner

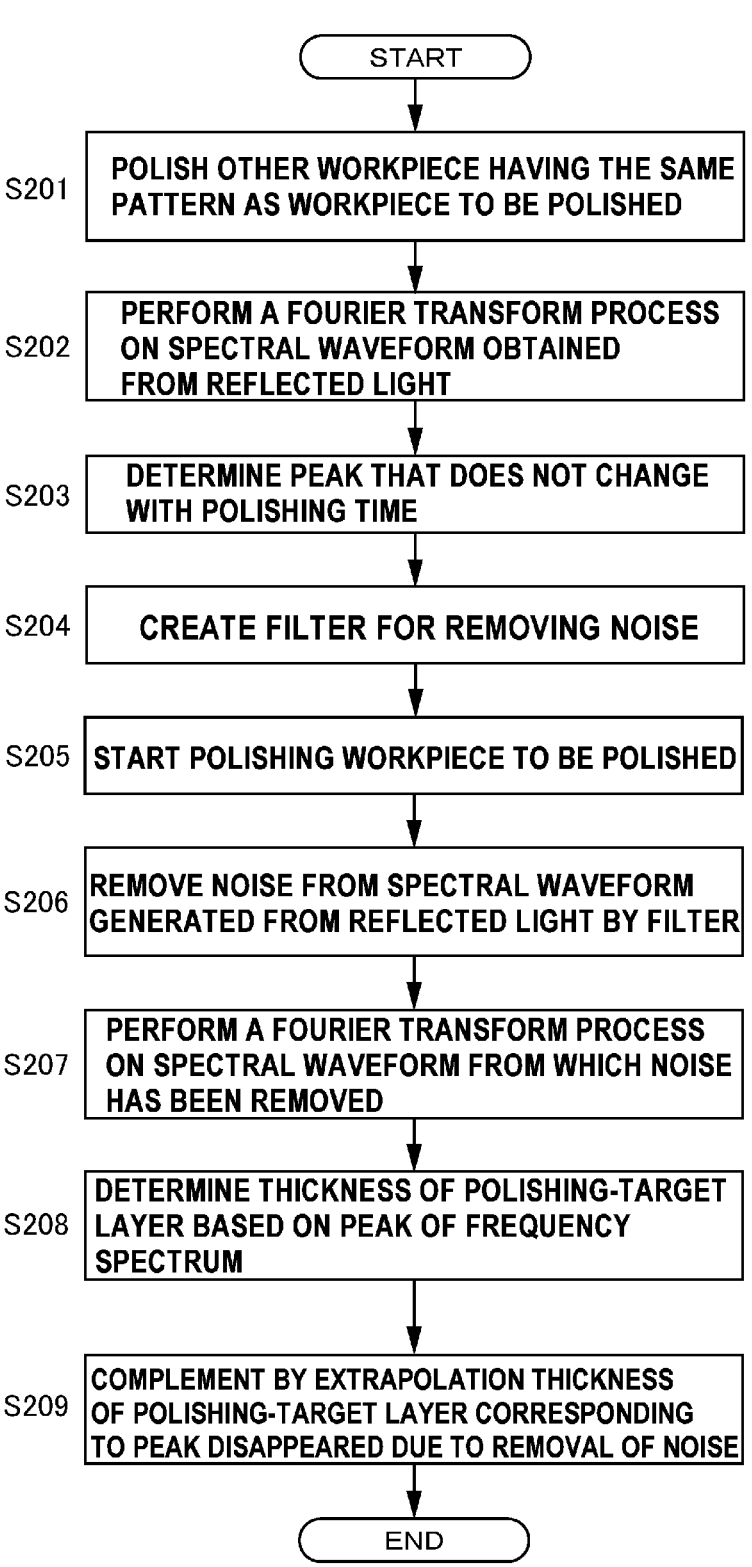

START

S201 | POLISH OTHER WORKPIECE HAVING THE SAME PATTERN AS WORKPIECE TO BE POLISHED

S202 | PERFORM A FOURIER TRANSFORM PROCESS ON SPECTRAL WAVEFORM OBTAINED FROM REFLECTED LIGHT

S203 | DETERMINE PEAK THAT DOES NOT CHANGE WITH POLISHING TIME

S204 | CREATE FILTER FOR REMOVING NOISE

S205 | START POLISHING WORKPIECE TO BE POLISHED

S206 | REMOVE NOISE FROM SPECTRAL WAVEFORM GENERATED FROM REFLECTED LIGHT BY FILTER

S207 | PERFORM A FOURIER TRANSFORM PROCESS ON SPECTRAL WAVEFORM FROM WHICH NOISE HAS BEEN REMOVED

S208 | DETERMINE THICKNESS OF POLISHING-TARGET LAYER BASED ON PEAK OF FREQUENCY SPECTRUM

S209 | COMPLEMENT BY EXTRAPOLATION THICKNESS OF POLISHING-TARGET LAYER CORRESPONDING TO PEAK DISAPPEARED DUE TO REMOVAL OF NOISE

END

WAVELENGTH $\lambda$

POLISHING TIME

POLISHING TIME

APPROXIMATE
EXPRESSION

AMOUNT OF CHANGE IN SPECTRUM

POLISHING TIME

AMOUNT OF CHANGE IN SPECTRUM

POLISHING TIME

FIG. 24

POLISHING METHOD, POLISHING MONITORING METHOD AND POLISHING MONITORING APPARATUS FOR WORKPIECE

CROSS REFERENCE TO RELATED APPLICATION

This document claims priorities to Japanese Patent Application No. 2020-194067 filed Nov. 24, 2020 and Japanese Patent Application No. 2020-200761 filed Dec. 3, 2020, the entire contents of which are hereby incorporated by reference.

BACKGROUND

A manufacturing process for a semiconductor device includes various processes, such as a process of polishing an insulating film (e.g., $SiO_2$) and a process of polishing a metal film (e.g., copper or tungsten). A manufacturing process for a back-illuminated CMOS sensor includes a process of polishing a silicon layer (or a silicon wafer) in addition to the process of polishing the insulating film or the metal film.

Polishing of a polishing-target layer (an insulating film, a metal film, a silicon layer, etc.) constituting an exposed surface of a workpiece is terminated when a thickness of the polishing-target layer has reached a predetermined target value. One example of a method of measuring the thickness of the polishing-target layer during polishing is an optical monitoring method that includes directing light onto a surface of the workpiece, performing a Fourier transform process on a spectral waveform of light reflected from the workpiece, and determining a thickness based on a peak of a frequency spectrum obtained (see, e.g., Japanese laid-open patent publication No. 2013-110390). The peak of the frequency spectrum changes depending on the thickness of the polishing-target layer. Therefore, the thickness of the polishing-target layer can be monitored by tracking the peak of the frequency spectrum during polishing of the workpiece.

In a manufacturing process for a semiconductor device, various materials are repeatedly formed on a silicon wafer to form films, which constitute a multilayer structure. In order to form such multilayer structure, a technique of planarizing a surface of an uppermost layer of the multilayer structure is becoming important. Chemical mechanical polishing (CMP) is used as one planarizing technique.

The chemical mechanical polishing (CMP) is performed by a polishing apparatus. This type of polishing apparatus generally includes a polishing table that supports a polishing pad, a polishing head configured to hold a workpiece (e.g., a wafer having a film), and a polishing-liquid supply nozzle configured to supply a polishing liquid (e.g., slurry) onto the polishing pad. When the workpiece is to be polished, the surface of the workpiece is pressed against the polishing pad by the polishing head while the polishing liquid is supplied onto the polishing pad from the polishing-liquid supply nozzle. The polishing head and the polishing table are rotated to move the workpiece and the polishing pad relative to each other, thereby polishing a polishing-target layer forming the surface of the workpiece.

In order to measure the thickness of the polishing-target layer, such as an insulating film or a silicon layer, the polishing apparatus generally includes an optical film-thickness measuring device. This optical film-thickness measuring device is configured to direct light, emitted by a light source, to the surface of the workpiece and analyze a spectrum of reflected light from the workpiece to determine the thickness of the polishing-target layer of the workpiece.

Japanese laid-open patent publication No. 2015-156503 discloses a technique of determining a film thickness based on an amount of change in a spectrum of reflected light. FIG. 21 is a graph showing a relationship between the amount of change in the spectrum and polishing time. The amount of change in the spectrum is an amount of change in shape of the spectrum per unit time. The spectrum of reflected light changes according to the thickness of the polishing-target layer. Therefore, the amount of change in the spectrum of the reflected light corresponds to an amount of removal of the polishing-target layer per unit time.

FIG. 22 is a graph showing a cumulative amount of change in the spectrum obtained by adding up amounts of change in the spectrum along the polishing time. As can be seen from FIG. 22, the cumulative amount of change in the spectral increases approximately monotonically with the polishing time. Therefore, an amount of polishing of the polishing-target layer (i.e., a current thickness or a current amount of removal) can be determined from the cumulative amount of change in the spectrum.

However, a false peak may appear in the frequency spectrum due to a polishing environment, such as slurry, or due to a lower layer lying under the polishing-target layer. The conventional optical monitoring method may erroneously track such false peak, thus failing to determine an accurate thickness.

Further, the conventional optical monitoring method may fail to determine the thickness of the polishing-target layer when the false peak caused by a noise overlaps a target peak corresponding to the thickness of the polishing-target layer.

Further, as shown in FIG. 23, a local noise may be added to the amount of change in the spectrum due to an influence of a pattern formed on the surface of the workpiece, or due to an influence of a polishing environment (e.g., slurry). Therefore, as shown in FIG. 24, the cumulative amount of change in the spectrum may not increase monotonically, and may result in a false estimation of the amount of polishing of the polishing-target layer.

SUMMARY

Therefore, there is provided a polishing method capable of accurately determining a thickness of a polishing-target layer without being affected by noises.

Further, there are provided a method and an apparatus capable of accurately monitoring polishing of a workpiece by eliminating an influence of a pattern formed on a surface of a workpiece, a polishing environment (e.g., slurry), and the like.

Embodiments, which will be described below, relate to a method of polishing a workpiece, such as a wafer, a substrate, or a panel, and more particularly to a technique for determining a thickness of a polishing-target layer based on a spectrum of reflected light from the workpiece.

Embodiments, which will be described below, also relate to a method and an apparatus for polishing a workpiece, such as a wafer, a substrate, or a panel, and more particularly to a technique for monitoring polishing of the workpiece based on optical information contained in reflected light from the workpiece.

In an embodiment, there is provided a polishing method for polishing a polishing-target layer of a workpiece, comprising: rotating a polishing table supporting a polishing pad; polishing the polishing-target layer by pressing the workpiece against the polishing pad; irradiating the workpiece with light; receiving reflected light from the workpiece; measuring an intensity of the reflected light at each of wavelengths; generating a spectral waveform showing a relationship between the intensity and wavelength of the reflected light; performing a Fourier transform process on the spectral waveform to generate a frequency spectrum; moving a peak search range for the frequency spectrum according to a polishing time; determining a peak of the frequency spectrum within the peak search range; and determining a thickness of the polishing-target layer corresponding to the determined peak.

In an embodiment, the peak search range is a range that includes a value calculated based on a thickness of the polishing-target layer determined last time and a polishing rate of the workpiece.

In an embodiment, the polishing rate is a preset polishing rate.

In an embodiment, the polishing rate is a polishing rate calculated during polishing of the workpiece.

In an embodiment, there is provided a polishing method for polishing a polishing-target layer of a workpiece, comprising: rotating a polishing table supporting a polishing pad; polishing the polishing-target layer by pressing the workpiece against the polishing pad; irradiating the workpiece with light; receiving reflected light from the workpiece; measuring an intensity of the reflected light at each of wavelengths; generating a spectral waveform showing a relationship between the intensity and wavelength of the reflected light; removing a noise from the spectral waveform by a filter; performing a Fourier transform process on the spectral waveform, from which the noise is removed, to generate a frequency spectrum; determining a thickness of the polishing-target layer based on a peak of the frequency spectrum; and complementing, by extrapolation, a thickness of the polishing-target layer corresponding to a peak of the frequency spectrum disappeared as a result of the removal of the noise, the extrapolation using a plurality of values of the thickness of the polishing-target layer obtained during polishing of the workpiece.

In an embodiment, the filter is configured to remove, from the spectral waveform, the noise having a frequency of a peak of the frequency spectrum that does not move with a polishing time of the workpiece.

In an embodiment, the noise is a noise caused by light reflected from a lower layer lying under the polishing-target layer.

In an embodiment, the filter is a band stop filter.

In an embodiment, the polishing method further comprising: polishing other workpiece before polishing of the workpiece, the other workpiece having the same pattern as the workpiece; and producing the filter for removing a noise contained in a spectral waveform of reflected light from the other workpiece.

In an embodiment, the polishing method further comprising producing the filter for removing the noise contained in the spectral waveform of reflected light from the workpiece during polishing of the workpiece.

In an embodiment, there is provided a polishing apparatus for polishing a polishing-target layer of a workpiece, comprising: a polishing table configured to support a polishing pad, the polishing table being rotatable; a polishing head configured to press the workpiece against the polishing pad on the polishing table; an optical sensor head configured to irradiate the workpiece held by the polishing head with light and receive reflected light from the workpiece; a spectrometer configured to measure an intensity of the reflected light at each of wavelengths; and a polishing controller configured to determine a thickness of the polishing-target layer from the intensity of the reflected light, the polishing controller being configured to: generate a spectral waveform showing a relationship between the intensity and the wavelength of the reflected light; perform a Fourier transform process on the spectral waveform to generate a frequency spectrum; move a peak search range for the frequency spectrum according to a polishing time; determine a peak of the frequency spectrum within the peak search range; and determine a thickness of the polishing-target layer corresponding to the determined peak.

In an embodiment, there is provided a polishing apparatus for polishing a polishing-target layer of a workpiece, comprising: a polishing table configured to support a polishing pad, the polishing table being rotatable; a polishing head configured to press the workpiece against the polishing pad on the polishing table; an optical sensor head configured to irradiate the workpiece held by the polishing head with light and receive reflected light from the workpiece; a spectrometer configured to measure an intensity of the reflected light at each of wavelengths; and a polishing controller configured to determine a thickness of the polishing-target layer from the intensity of the reflected light, the polishing controller being configured to: generate a spectral waveform showing a relationship between the intensity and the wavelength of the reflected light; remove a noise from the spectral waveform by a filter; perform a Fourier transform process on the spectral waveform, from which the noise is removed, to generate a frequency spectrum; determine a thickness of the polishing-target layer based on a peak of the frequency spectrum; and complement, by extrapolation, a thickness of the polishing-target layer corresponding to a peak of the frequency spectrum disappeared as a result of the removal of the noise, the extrapolation using a plurality of values of the thickness of the polishing-target layer obtained during polishing of the workpiece.

In one embodiment, there is provided a computer-readable storage medium storing a program for causing a computer to perform steps of: instructing a table motor to rotate a polishing table supporting a polishing pad; instructing a polishing head to polish a polishing-target layer of a workpiece by pressing the workpiece against the polishing pad; instructing a light source to irradiate the workpiece with light; generating a spectral waveform showing a relationship between an intensity of reflected light from the workpiece and a wavelength of the reflected light; performing a Fourier transform process on the spectral waveform to generate a frequency spectrum; moving a peak search range for the frequency spectrum according to a polishing time; determining a peak of the frequency spectrum within the peak search range; and determining a thickness of the polishing-target layer corresponding to the determined peak.

In one embodiment, there is provided a computer-readable storage medium storing a program for causing a computer to perform steps of: instructing a table motor to rotate a polishing table supporting a polishing pad; instructing a polishing head to polish a polishing-target layer of a workpiece by pressing the workpiece against the polishing pad; instructing a light source to irradiate the workpiece with light; generating a spectral waveform showing a relationship between an intensity of reflected light from the workpiece and a wavelength of the reflected light; removing a noise from the spectral waveform by a filter; performing a Fourier transform process on the spectral waveform, from which the noise is removed, to generate a frequency spectrum; determining a thickness of the polishing-target layer based on a peak of the frequency spectrum; and complementing, by extrapolation, a thickness of the polishing-target layer corresponding to a peak of the frequency spectrum disappeared as a result of the removal of the noise, the extrapolation using a plurality of values of the thickness of the polishing-target layer obtained during polishing of the workpiece.

In an embodiment, there is provided a polishing monitoring method for a workpiece, comprising: irradiating the workpiece with light during polishing of the workpiece; generating a spectrum of reflected light from the workpiece; calculating an amount of change in the spectrum per predetermined time; correcting the amount of change in the spectrum when the amount of change in the spectrum satisfies a predetermined exclusion condition; and calculating a cumulative amount of change in the spectrum by adding up an amount of change in the spectrum that does not satisfy the exclusion condition and the corrected amount of change in the spectrum along a polishing time.

In an embodiment, the exclusion condition is one of: the amount of change in the spectrum is larger than a threshold value; a difference between a current amount of change in the spectrum and an average value of a plurality of amounts of change in the spectrum already obtained during polishing of the workpiece is larger than a threshold value; the amount of change in the spectrum is outside a range defined by an average value$\pm Z\sigma$ (Z is a predetermined coefficient), wherein the average value is an average value of a normal distribution of a plurality of amounts of change in the spectrum obtained in the past; and the amount of change in the spectrum is determined to be an outlier by Smirnov-Grabs test.

In an embodiment, correcting the amount of change in the spectrum comprises correcting the amount of change in the spectrum by extrapolation or interpolation.

In an embodiment, the correction by the extrapolation uses a plurality of amounts of change in the spectrum aligned along the polishing time, and the correction by the interpolation uses a plurality of amounts of change in the spectrum obtained at a plurality of measurement points aligned on the workpiece.

In an embodiment, there is provided a polishing monitoring apparatus for a workpiece, comprising: an optical sensor head configured to irradiate the workpiece with light and receive reflected light from the workpiece during polishing of the workpiece; a spectrometer configured to measure an intensity of the reflected light at each of wavelengths; and a data processor having a memory storing a program and an arithmetic device for performing arithmetic operations according to instructions included in the program, the data processor being configured to: generate a spectrum of the reflected light from an intensity measurement data of the reflected light; calculate an amount of change in the spectrum per predetermined time; correct the amount of change in the spectrum when the amount of change in the spectrum satisfies a predetermined exclusion condition; and calculate a cumulative amount of change in the spectrum by adding up an amount of change of the spectrum that does not satisfy the exclusion condition and the corrected amount of change in the spectrum along a polishing time.

In an embodiment, the exclusion condition is one of: the amount of change in the spectrum is larger than a threshold value; a difference between a current amount of change in the spectrum and an average value of a plurality of amounts of change in the spectrum already obtained during polishing of the workpiece is larger than a threshold value; the amount of change in the spectrum is outside a range defined by an average value$\pm Z\sigma$ (Z is a predetermined coefficient), wherein the average value is an average value of a normal distribution of a plurality of amounts of change in the spectrum obtained in the past; and the amount of change in the spectrum is determined to be an outlier by Smirnov-Grabs test.

In an embodiment, the data processor is configured to correct the amount of change in the spectrum by extrapolation or interpolation.

In an embodiment, the data processor is configured to perform the correction by the extrapolation using a plurality of amounts of change in the spectrum aligned along the polishing time, and perform the correction by the interpolation using a plurality of amounts of change in the spectrum obtained at a plurality of measurement points aligned on the workpiece.

According to the above-described embodiments, the polishing method can determine the accurate thickness of the polishing-target layer by moving the search range for the peak of the frequency spectrum according to the polishing time, without tracking the false peak caused by the noise.

Further, the polishing method can determine the accurate thickness of the polishing-target layer using the filter that removes noises from the spectral waveform generated from the reflected light from the workpiece.

Further, according to the above-described embodiments, the amount of change in the spectrum satisfying the exclusion condition (i.e., the spectrum containing a noise) is corrected, and the polishing of the workpiece can be accurately monitored.

BRIEF DESCRIPTION OF THE DRAWINGS

FIG. 2 is a schematic diagram for explaining the principle of an optical film-thickness measuring device;

FIG. 6 is a diagram illustrating a peak search range in an Nth measurement;

FIG. 13 is a flow chart illustrating an example of a process of removing a noise by a filter;

Figure 24:
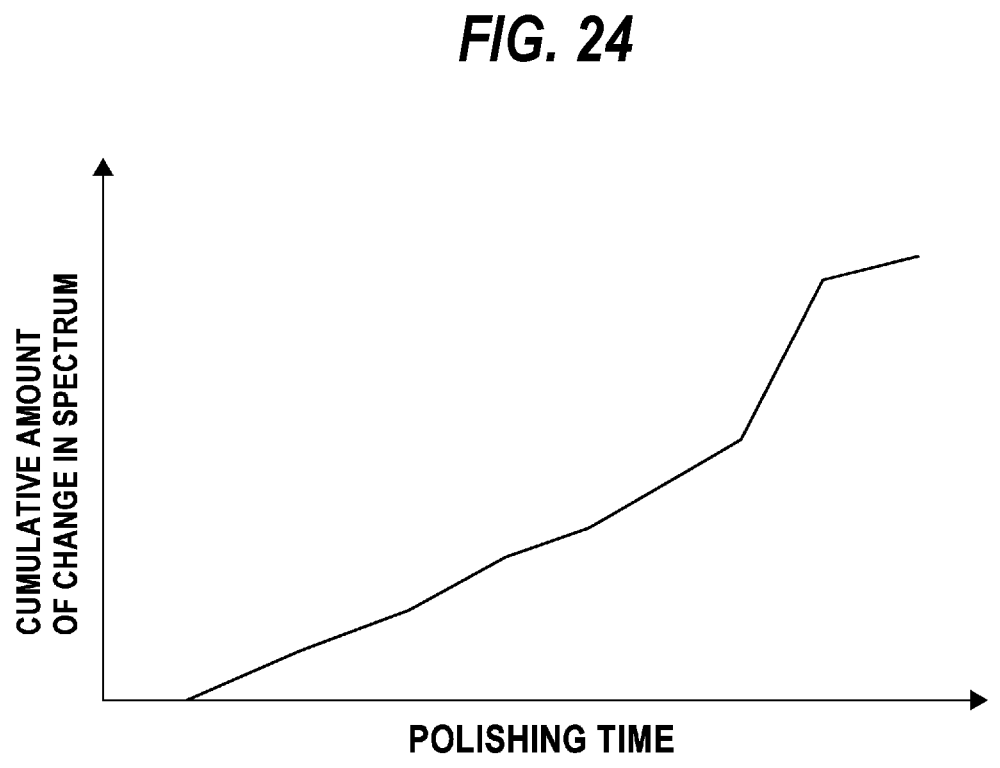

FIG. 24 is a graph showing a relationship between a cumulative amount of change in the spectrum obtained by adding up the amounts of change in the spectrum shown in FIG. 23 and the polishing time.

DESCRIPTION OF EMBODIMENTS

Embodiments will be described below with reference to the drawings.

Figure 1:
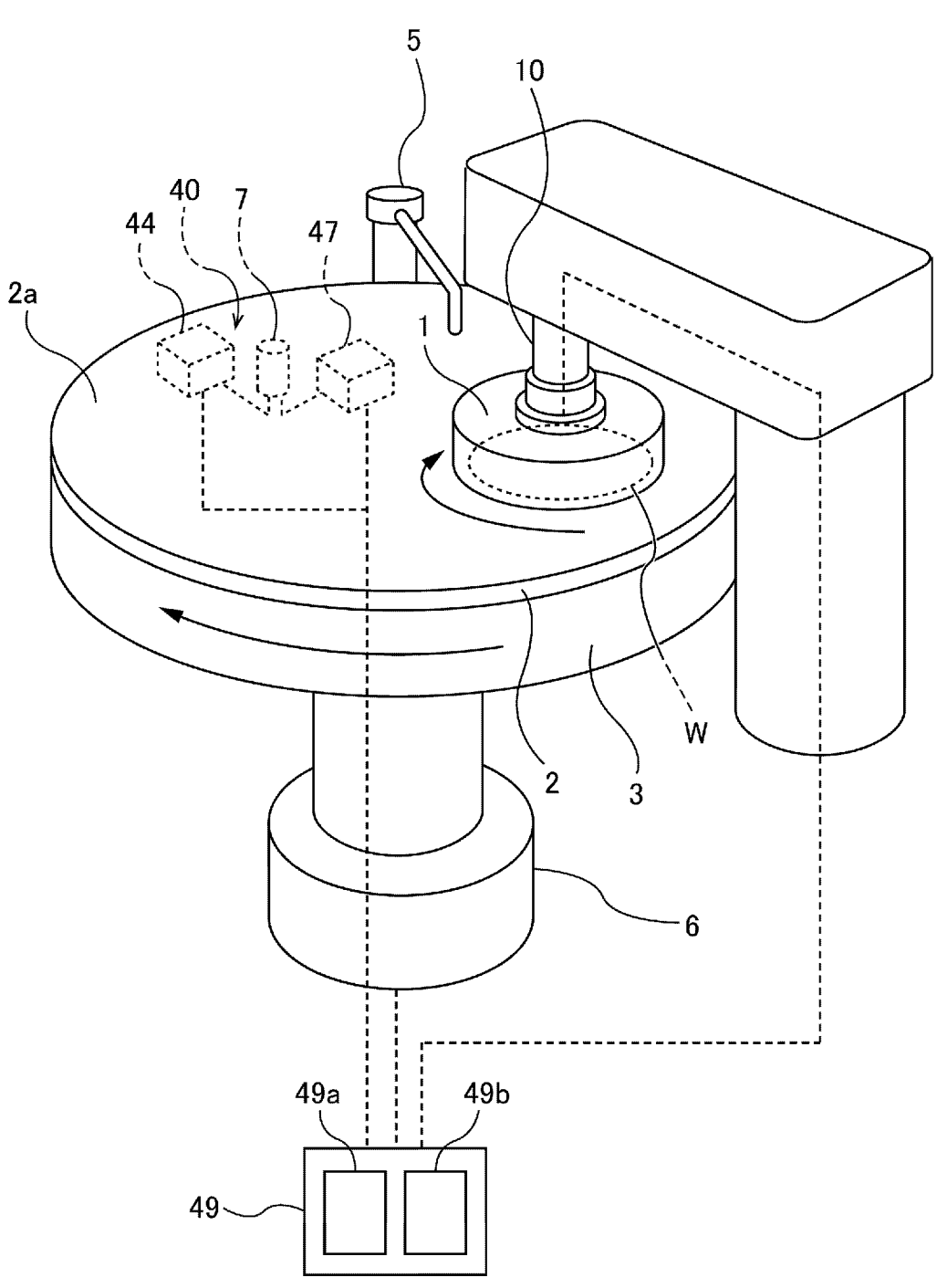
FIG. 1 is a schematic diagram showing an embodiment of a polishing apparatus.

FIG. 1 is a schematic diagram showing an embodiment of a polishing apparatus. As shown in FIG. 1, the polishing apparatus includes a polishing table 3 configured to support a polishing pad 2, a polishing head 1 configured to press a workpiece W having a polishing-target layer against the polishing pad 2, a table motor 6 configured to rotate the polishing table 3, a polishing-liquid supply nozzle 5 configured to supply a polishing liquid, such as a slurry, onto the polishing pad 2, and a polishing controller 49 configured to control an operation of the polishing apparatus. An upper surface of the polishing pad 2 constitutes a polishing surface 2a for polishing the workpiece W. Examples of the workpiece W include a wafer, a substrate, a panel, etc.

The polishing head 1 is coupled to a head shaft 10, and the head shaft 10 is coupled to a polishing-head motor (not shown). The polishing-head motor is configured to rotate the polishing head 1 together with the head shaft 10 in a direction indicated by an arrow. The polishing table 3 is coupled to the table motor 6, which is configured to rotate the polishing table 3 and the polishing pad 2 in a direction indicated by an arrow. The polishing head 1, the polishing-head motor, and the table motor 6 are coupled to the polishing controller 49.

Polishing of the workpiece W is performed as follows. The polishing-liquid supply nozzle 5 supplies the polishing liquid onto the polishing surface 2a of the polishing pad 2 on the polishing table 3, while the polishing table 3 and the polishing head 1 are rotated in directions indicated by the arrows in FIG. 1. While the workpiece W is being rotated by the polishing head 1, the workpiece W is pressed by the polishing head 1 against the polishing surface 2a of the polishing pad 2 in the presence of the polishing liquid on the polishing pad 2. The surface of the workpiece W is polished by a chemical action of the polishing liquid and a mechanical action of abrasive grains contained in the polishing liquid, and the polishing pad 2.

The polishing apparatus includes an optical film-thickness measuring device 40 configured to measure a thickness of the polishing-target layer of the workpiece W. The optical film-thickness measuring device 40 includes a light source 44 configured to emit light, a spectrometer 47, and an optical sensor head 7 coupled to the light source 44 and the spectrometer 47. The light source 44 and the spectrometer 47 are coupled to the polishing controller 49. The optical sensor head 7, the light source 44, and the spectrometer 47 are secured to the polishing table 3, and rotate together with the polishing table 3 and the polishing pad 2. The position of the optical sensor head 7 is such that the optical sensor head 7 sweeps across the surface of the workpiece W on the polishing pad 2 each time the polishing table 3 and the polishing pad 2 make one rotation.

The light emitted by the light source 44 is transmitted to the optical sensor head 7, and irradiates the surface of the workpiece W. The light is reflected off the workpiece W, and the reflected light from the workpiece W is received by the optical sensor head 7 and is further transmitted to the spectrometer 47. The spectrometer 47 decomposes the reflected light according to wavelength, and measures an intensity of the reflected light at each of the wavelengths. The intensity measurement data of the reflected light is transmitted to the polishing controller 49.

The polishing controller 49 is configured to produce a spectrum of the reflected light from the intensity measurement data of the reflected light. This spectrum of the reflected light is expressed as a line graph (i.e., a spectral waveform) indicating a relationship between the wavelength and the intensity of the reflected light. The intensity of the reflected light can also be represented by a relative value, such as a reflectance or a relative reflectance.

Figure 2:
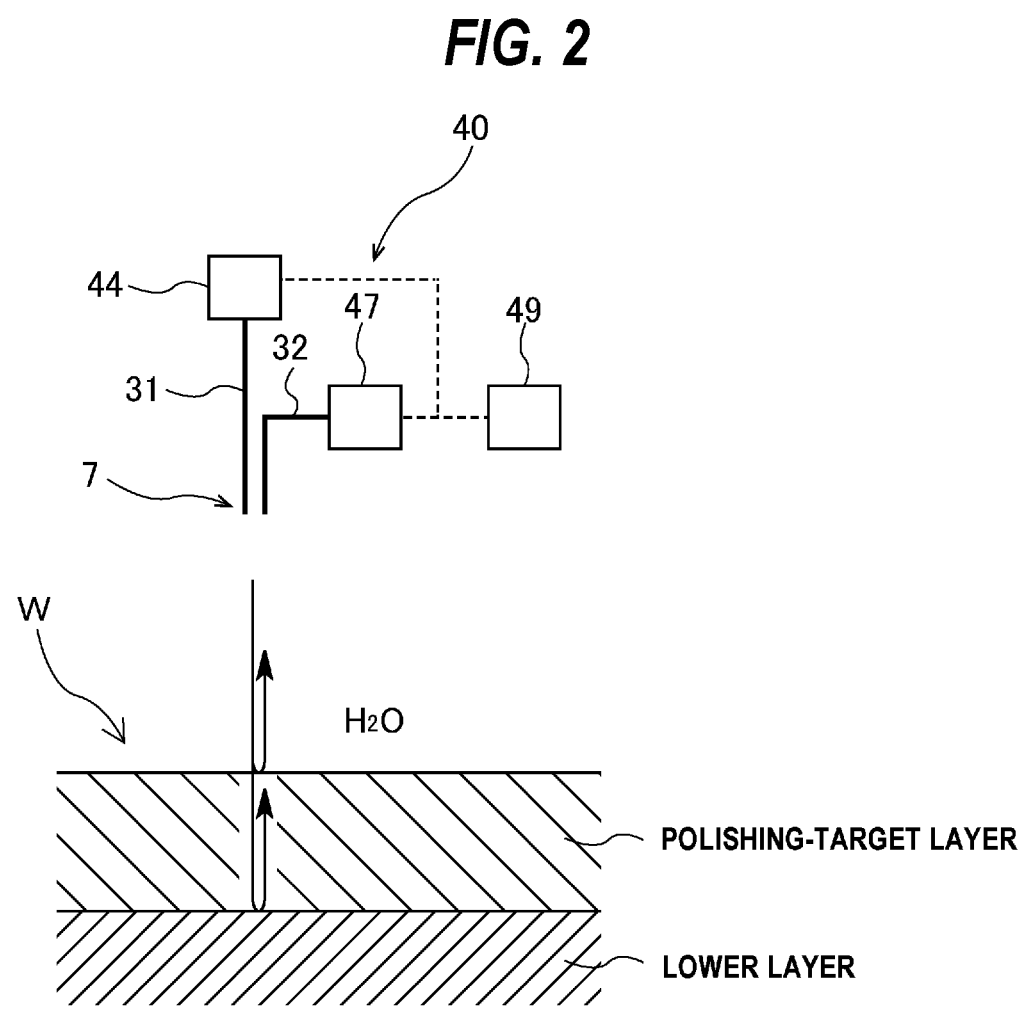
Figure 3:
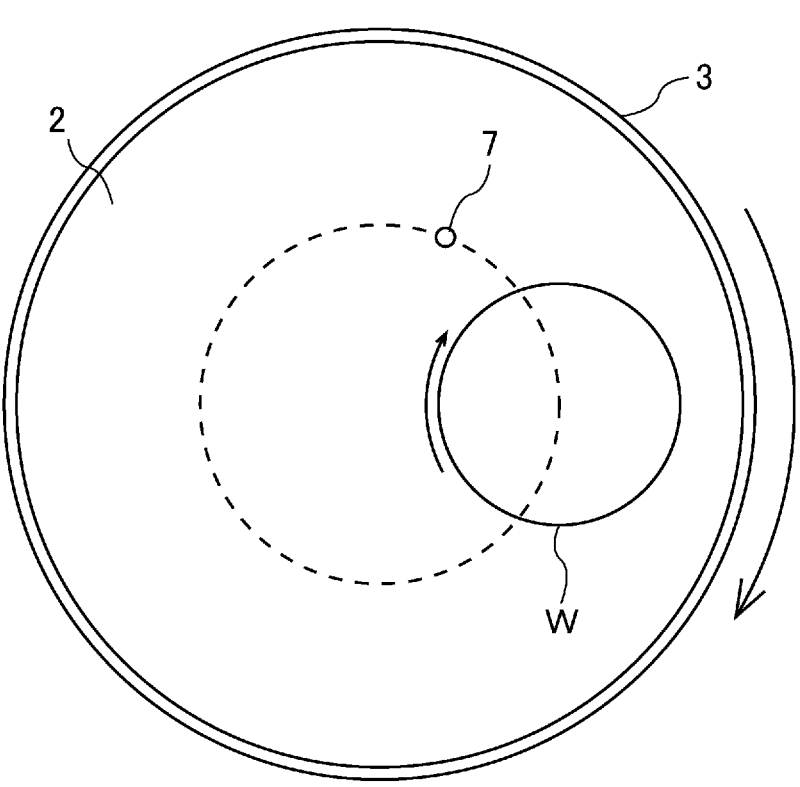
FIG. 3 is a plan view showing a positional relationship between a workpiece and a polishing table.

FIG. 2 is a schematic diagram for explaining the principle of the optical film-thickness measuring device 40, and FIG. 3 is a plan view showing a positional relationship between the workpiece W and the polishing table 3. In the example shown in FIG. 2, the workpiece W has a lower layer and a polishing-target layer formed on the lower layer. The polishing-target layer is, for example, a silicon layer or an insulating film.

The optical sensor head 7 is constituted by distal ends of a light-emitting optical fiber cable 31 and a light-receiving optical fiber cable 32, and is oriented toward the surface of the workpiece W. The optical sensor head 7 irradiates the workpiece W with the light and receives the reflected light from the workpiece W, each time the polishing table 3 makes one rotation.

The light, which is cast on the workpiece W, is reflected off an interface between a medium (e.g., water in the example in FIG. 2) and the polishing-target layer and an interface between the polishing-target layer and the lower layer. Light waves from these interfaces interfere with each other. The manner of interference between the light waves varies according to the thickness of the polishing-target layer (i.e., a length of an optical path). As a result, the spectrum, produced from the reflected light from the workpiece W, varies according to the thickness of the polishing-target layer. The polishing controller 49 performs a Fourier transform process (or a fast Fourier transform process) on the spectral waveform to generate a frequency spectrum, and determines the thickness of the polishing-target layer based on a peak of the frequency spectrum. When the polishing-target layer is a silicon layer and the medium is water as shown in FIG. 2, it is preferable to use light with a wavelength of 1100 nm or less in order to prevent the light from being absorbed by the water.

During polishing of the workpiece W, each time the polishing table 3 makes one rotation, the optical sensor head 7 sweeps across the workpiece W. While the optical sensor head 7 is located below the workpiece W, the light source 44 emits the light. The light is transmitted through the light-emitting optical fiber cable 31 and irradiates the surface (surface to be polished) of the workpiece W from the optical sensor head 7. The reflected light from the workpiece W is received by the optical sensor head 7 and is transmitted to the spectrometer 47 through the light-receiving optical fiber cable 32. The spectrometer 47 measures the intensity of the reflected light at each of the wavelengths over a predetermined wavelength range and sends the intensity measurement data of the reflected light to the polishing controller 49. The polishing controller 49 produces a spectrum of the reflected light (i.e., a spectral waveform) showing the light intensities at the respective wavelengths from the intensity measurement data.

Figure 4:
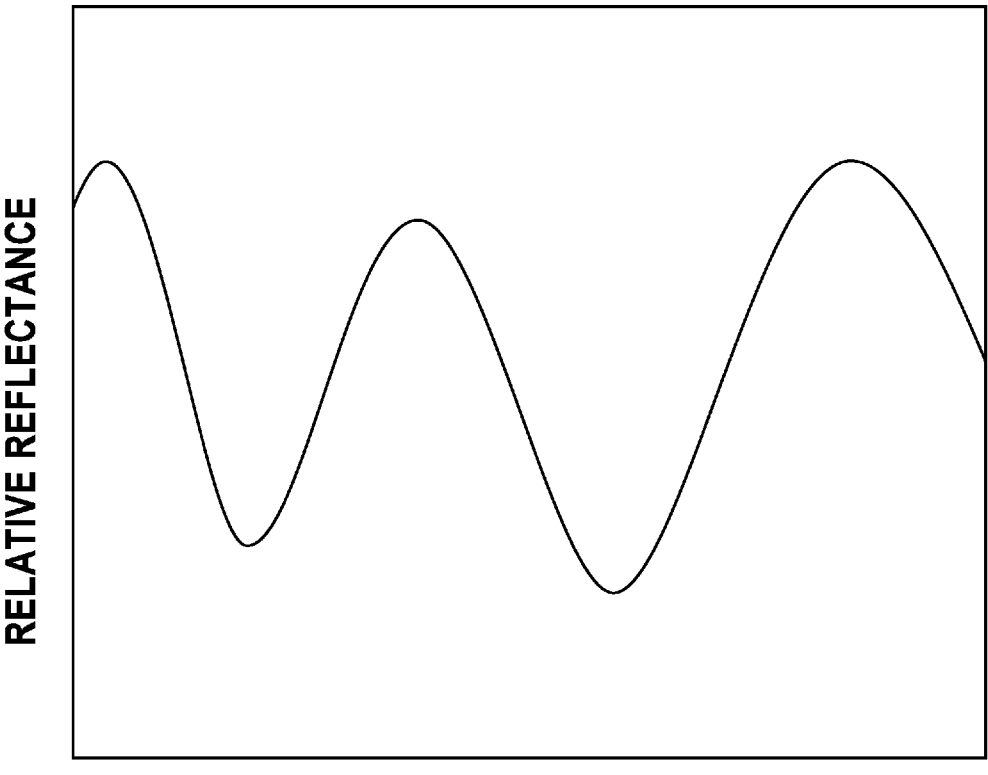
FIG. 4 is a diagram showing an example of a spectral waveform generated by a polishing controller.

FIG. 4 is a diagram showing an example of a spectral waveform generated by the polishing controller 49. In FIG. 4, horizontal axis represents the wavelength of the reflected light from the workpiece W, and vertical axis represents a relative reflectance derived from the intensity of the reflected light. The relative reflectance is an index that represents the intensity of the reflected light. The relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity of light measured in advance at each of the wavelength. The relative reflectance is calculated at each of the wavelength. Specifically, the relative reflectance is determined by dividing the intensity of the light (the actual intensity) at each wavelength by the corresponding reference intensity. The reference intensity is obtained by directly measuring the intensity of light emitted from the optical sensor head 7, or by irradiating a mirror with light from the optical sensor head 7 and measuring an intensity of reflected light from the mirror. Alternatively, the reference intensity may be an intensity of reflected light from a silicon substrate (bare substrate) with no film thereon measured by the spectrometer 47 when the silicon substrate is being water-polished on the polishing pad 2 in the presence of water, or when the silicon substrate (bare substrate) is placed on the polishing pad 2.

In the actual polishing process, a dark level (which is a background intensity obtained under the condition that the light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is, the relative reflectance R($\lambda$) can be calculated by using $$R(\lambda) = \frac{E(\lambda) - D(\lambda)}{B(\lambda) - D(\lambda)} \qquad (1)$$

where, $\lambda$ is wavelength of the light reflected from the workpiece W, E($\lambda$) is the intensity at the wavelength $\lambda$, B($\lambda$) is the reference intensity at the wavelength $\lambda$, and D($\lambda$) is the background intensity (i.e., dark level) at the wavelength $\lambda$ measured under the condition that the light is cut off.

The polishing controller 49 instructs the light source 44 to generate light each time the polishing table 3 makes one rotation. The optical sensor head 7 optically connected to the light source 44 directs the light to the surface (surface to be polished) of the workpiece W, and further the optical sensor head 7 receives reflected light from the workpiece W. The reflected light is transmitted to the spectrometer 47 optically connected to the optical sensor head 7. The spectrometer 47 decomposes the reflected light according to the wavelength, and measures the intensity of the reflected light at each of the wavelengths. The intensity measurement data of the reflected light is transmitted to the polishing controller 49, and the polishing controller 49 generates a spectrum as shown in FIG. 4 from the intensity measurement data of the reflected light. In the example shown in FIG. 4, the spectrum of the reflected light is a spectral waveform showing the relationship between the relative reflectance and the wavelength of the reflected light. The spectrum of the reflected light may be a spectral waveform showing a relationship between the intensity itself of the reflected light and the wavelength of the reflected light.

The polishing controller 49 performs a Fourier transform process (typically, a fast Fourier transform process) on the obtained spectral waveform to analyze the spectral waveform. More specifically, the polishing controller 49 performs a Fourier transform process (or a fast Fourier transform process) on the spectral waveform to extract the frequency component and its intensity contained in the spectral waveform. The obtained frequency component is converted into the thickness of the polishing-target layer with use of a predetermined relational expression, so that frequency spectrum is generated. This frequency spectrum represents a relationship between the thickness of the polishing-target layer and the intensity of the frequency component. The above-mentioned predetermined relational expression is a function representing the thickness of the polishing-target layer and having the frequency component as variable. This function can be obtained from an actual measurement result, an optical film-thickness measurement simulation, a theoretical expression, etc.

Figure 5:
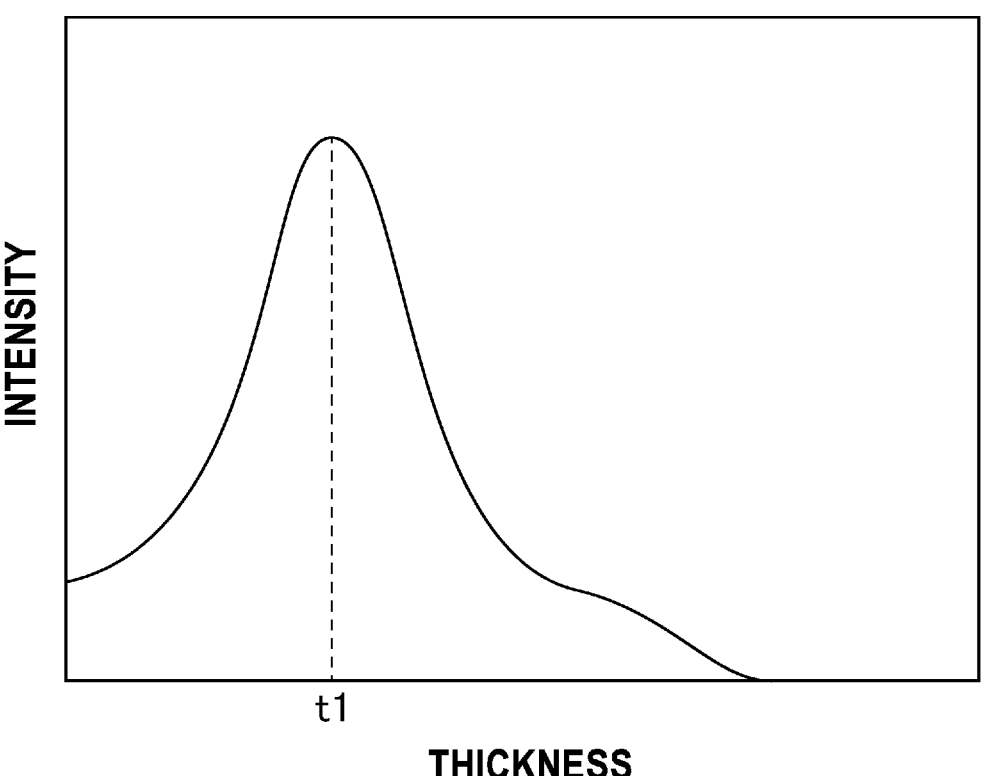
FIG. 5 is a diagram showing an example of a frequency spectrum generated by the polishing controller.

FIG. 5 is a diagram showing the frequency spectrum generated by the polishing controller 49. In FIG. 5, vertical axis represents the intensity of the frequency component contained in the spectral waveform, and horizontal axis represents the thickness of the polishing-target layer. As can be seen from FIG. 5, the frequency spectrum has a peak at a thickness t1. This frequency spectrum indicates that the thickness of the polishing-target layer is t1. In this way, the thickness of the polishing-target layer is determined from the peak of the frequency spectrum.

The polishing controller 49 includes a memory 49*a* storing programs therein for determining the thickness of the polishing-target layer, and a processing device 49*b* for performing arithmetic operations according to instructions included in the programs. The polishing controller 49 is composed of at least one computer. The memory 49*a* includes a main memory, such as RAM, and an auxiliary memory, such as a hard disk drive (HDD) or a solid state drive (SSD). Examples of the processing device 49*b* include a CPU (central processing unit) and a GPU (graphic processing unit). However, the specific configurations of the polishing controller 49 are not limited to these examples.

The polishing controller 49 determines a polishing end point based on the determined thickness of the polishing-target layer, and controls the operation of the polishing apparatus. For example, the polishing controller 49 determines a polishing end point at which the determined thickness of the polishing-target layer reaches a target value. In one embodiment, the polishing end point may be determined by measuring a total thickness of the polishing-target layer and the lower layer. A polishing controller for determining the thickness of the polishing-target layer and a controller for controlling the polishing operation of the workpiece W may be configured separately.

Figure 6:
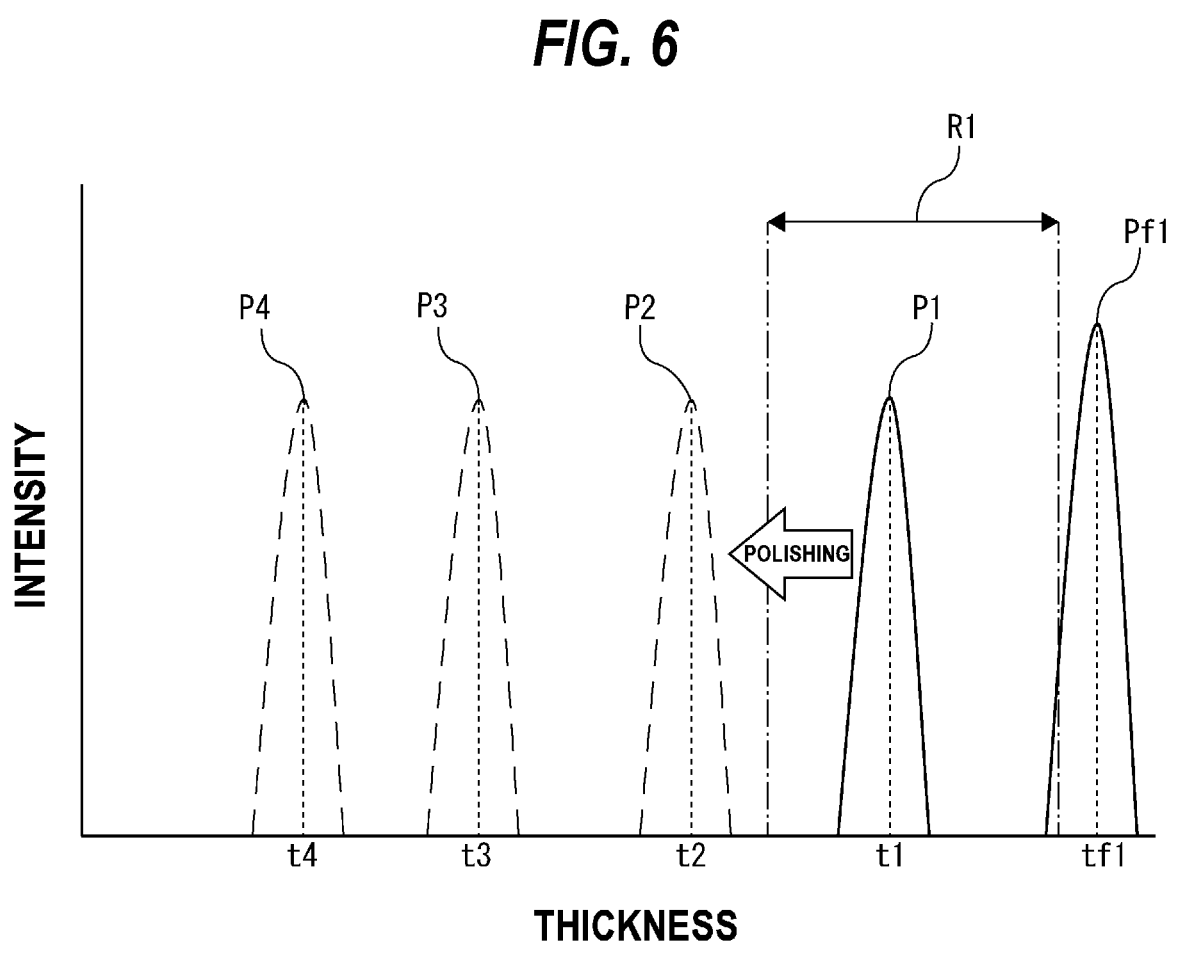

FIG. 6 is a diagram illustrating a peak search range R1 in an Nth measurement. In FIG. 6, vertical axis represents the intensity of the frequency component contained in the spectral waveform, and horizontal axis represents the thickness of the polishing-target layer. Each of frequency spectra shown in FIG. 6 is generated by the polishing controller 49 each time the polishing table 3 makes one rotation during polishing of the workpiece W. A peak P1 is a peak appearing in the Nth measurement (when the polishing table 3 is in an Nth rotation), a peak P2 is a peak appearing in an N+1st measurement (when the polishing table 3 is in an N+1st rotation), a peak P3 is a peak appearing in an N+2nd measurement (when the polishing table 3 is in an N+2nd rotation), and a peak P4 is a peak appearing in an N+3rd measurement (when the polishing table 3 is in an N+3rd rotation). In FIG. 6, peaks having small intensity of frequency component are omitted. A reference numeral N is a natural number, e.g., 1.

As shown in FIG. 6, the peak of the frequency spectrum moves with a progress of polishing of the workpiece W. The polishing-target layer of the workpiece W is polished while the polishing table 3 is making one rotation. Therefore, the thickness of the polishing-target layer becomes smaller each time the polishing table 3 makes one rotation. The relationship between a thickness t1 corresponding to the peak P1, a thickness t2 corresponding to the peak P2, a thickness t3 corresponding to the peak P3, and a thickness t4 corresponding to the peak P4 is t1>t2>t3>t4.

The thickness of the polishing-target layer is determined by the optical film-thickness measuring device 40 based on the peak of the frequency spectrum each time the polishing table 3 makes one rotation. However, the polishing controller 49 may erroneously determine the thickness of the polishing-target layer due to a false peak caused by noises during polishing of the workpiece W (caused by the polishing environment, such as slurry, or caused by the lower layer, etc.). In FIG. 6, a false peak Pf1 is a peak caused by a noise generated during polishing of the workpiece W, and is a false peak appearing in the Nth measurement. In this case, in the Nth measurement, the thickness of the polishing-target layer is erroneously determined to be a thickness tf1 corresponding to the false peak Pf1 having a higher intensity than the peak P1.

Thus, the polishing controller 49 is configured to search for a peak of the frequency spectrum within a peak search range R1. In the example shown in FIG. 6, the polishing controller 49 determines the peak P1 within the peak search range R1, and determines that the thickness of the polishing-target layer is the thickness t1 (i.e., the accurate thickness) corresponding to the determined peak P1. Since the false peak Pf1 does not exist within the peak search range R1, the false peak Pf1 is not erroneously determined.

In FIG. 6, the peak search range R1 represents a peak search range in the Nth measurement. In one embodiment, the polishing controller 49 determines the peak search range R1 based on a value of an initial thickness of the polishing-target layer. For example, the peak search range R1 may be a range including a value of the initial thickness of the polishing-target layer of the workpiece W. The initial thickness of the polishing-target layer is a thickness of the polishing-target layer before polishing of the workpiece W is started, and is measured in advance by a stand-alone film-thickness measuring device (not shown) or is provided as basic information of the workpiece W.

Figure 7:
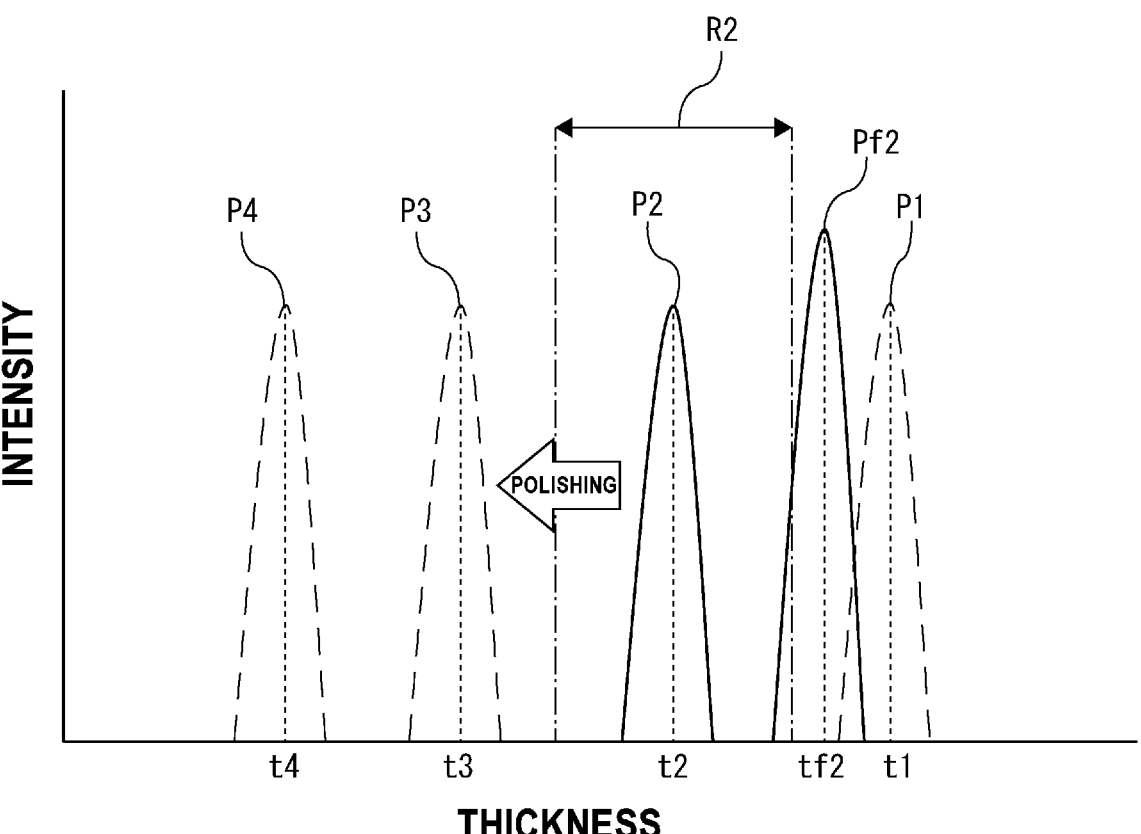
FIG. 7 is a diagram illustrating a peak search range in an N+1st measurement.

FIG. 7 is a diagram illustrating a peak search range R2 in the N+1st measurement. In FIG. 7, peaks P1 to P4 are the same as the peaks described with reference to FIG. 6. A false peak Pf2 represents a peak caused by a noise generated during polishing of the workpiece W, and is a false peak appearing in the N+1st measurement. Since the false peak Pf2 is within the peak search range R1 in the previous Nth measurement, the polishing controller 49 erroneously determines that the thickness of the polishing-target layer is a thickness tf2 corresponding to the false peak Pf2.

Thus, in the present embodiment, the polishing controller 49 is configured to move the peak search range for the frequency spectrum according to the polishing time. As described above, the thickness of the polishing-target layer becomes smaller with the progress of the polishing of the workpiece W, i.e., the peak of the frequency spectrum moves. The polishing controller 49 moves the peak search range so as to follow the change in the thickness of the polishing-target layer, so that the polishing controller 49 can accurately determine the thickness of the polishing-target layer even in the presence of the false peak.

In FIG. 7, the peak search range R2 represents a peak search range in the N+1st measurement. The polishing controller 49 moves the peak search range so as to follow the change in the thickness of the polishing-target layer with the polishing time. In the N+1st measurement, the peak search range is moved from the peak search range R1 in FIG. 6 to the peak search range R2. For example, the peak search range R2 may be calculated based on the thickness t1 of the polishing-target layer determined last time and a polishing rate of the workpiece W, as will be described later.

The polishing controller 49 determines the peak P2 existing within the peak search range R2, and determines that the thickness of the polishing-target layer is the t2 (i.e., an accurate thickness) corresponding to the determined peak P2. Since the false peak Pf2 is not within the peak search range R2, the false peak Pf2 is not erroneously determined. Similarly, in the N+2nd measurement and subsequent measurements, the accurate thickness of the polishing-target layer can be determined by moving the peak search range according to the polishing time.

Figure 8:
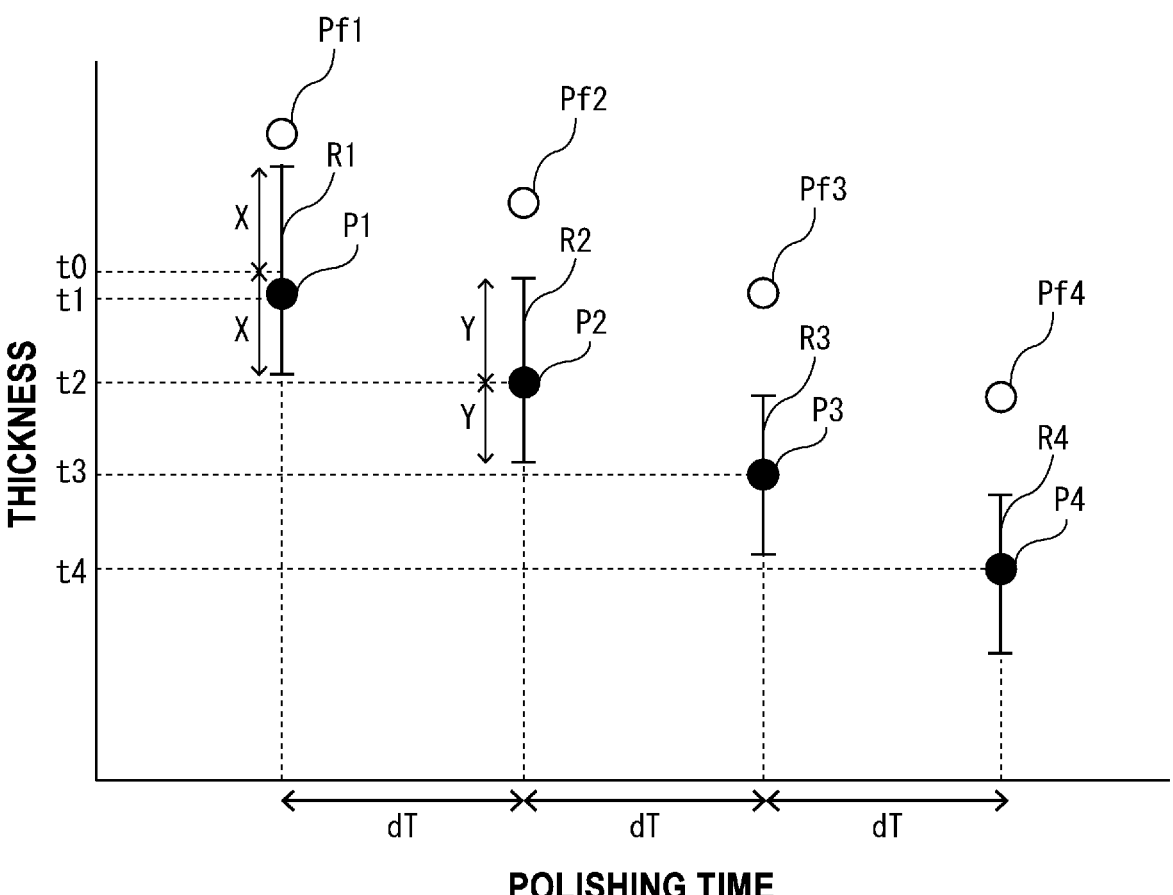
FIG. 8 is a diagram illustrating moving the peak search range according to a polishing time.

FIG. 8 is a diagram illustrating a manner of moving the peak search range according to the polishing time. In FIG. 8, peaks P1 to P4, false peaks Pf1 and Pf2, and peak search ranges R1 and R2 correspond to the same reference numerals shown in FIGS. 6 and 7. The graph in FIG. 8 shows a relationship between the polishing time and the thickness corresponding to each of the peaks. A false peak Pf3 represents a false peak appearing in the N+2nd measurement. A false peak Pf4 represents a false peak appearing in the N+3rd measurement. A peak search range R3 represents a peak search range moved in the N+2nd measurement. A peak search range R4 represents a peak search range moved in the N+3rd measurement.

In FIG. 8, an initial value t0 represents a thickness of the polishing-target layer before the polishing of the workpiece W. The initial value t0 is an initial thickness of the polishing-target layer measured in advance before the polishing of the workpiece W, or a value provided by a user. In one embodiment, the peak search range R1 in the Nth measurement is established based on the initial value t0. Specifically, the peak search range R1 is determined by using $$\text{Peak search range } R1 = \text{initial value } t0 \pm \text{first set value } X \tag{2}$$

where, the first set value X can be any value set by the user.

In one embodiment, the peak search range R2 is set to a range including a value calculated based on the thickness t1 of the polishing-target layer determined last time and a polishing rate PR of the workpiece W. Specifically, the peak search range R2 is established by the following formula (3).

$$\text{Peak search range } R2 = (\text{thickness } t1 \text{ determined last time} - (\text{polishing rate } PR \times \text{time interval } dT)) \pm \text{second set value } Y \tag{3}$$

The polishing rate may be referred to as a removal rate. The time interval dT corresponds to a time required for the polishing table 3 to make one rotation. Normally, the time interval dT is constant during polishing of the workpiece W. The polishing rate PR may be a preset polishing rate. The second set value Y can be any value set by the user. The second set value Y may be smaller than or the same as the first set value X.

The peak search ranges R3 and R4 are calculated by using the formula (3) in the same manner as the peak search range R2. In the formula (3), the polishing rate PR may be a preset polishing rate or a polishing rate calculated during polishing of the workpiece W. The polishing rate can be calculated from a plurality of values of the thickness of the polishing-target layer obtained during polishing of the workpiece W and a polishing time required for the plurality of values to be obtained.

Figure 9:
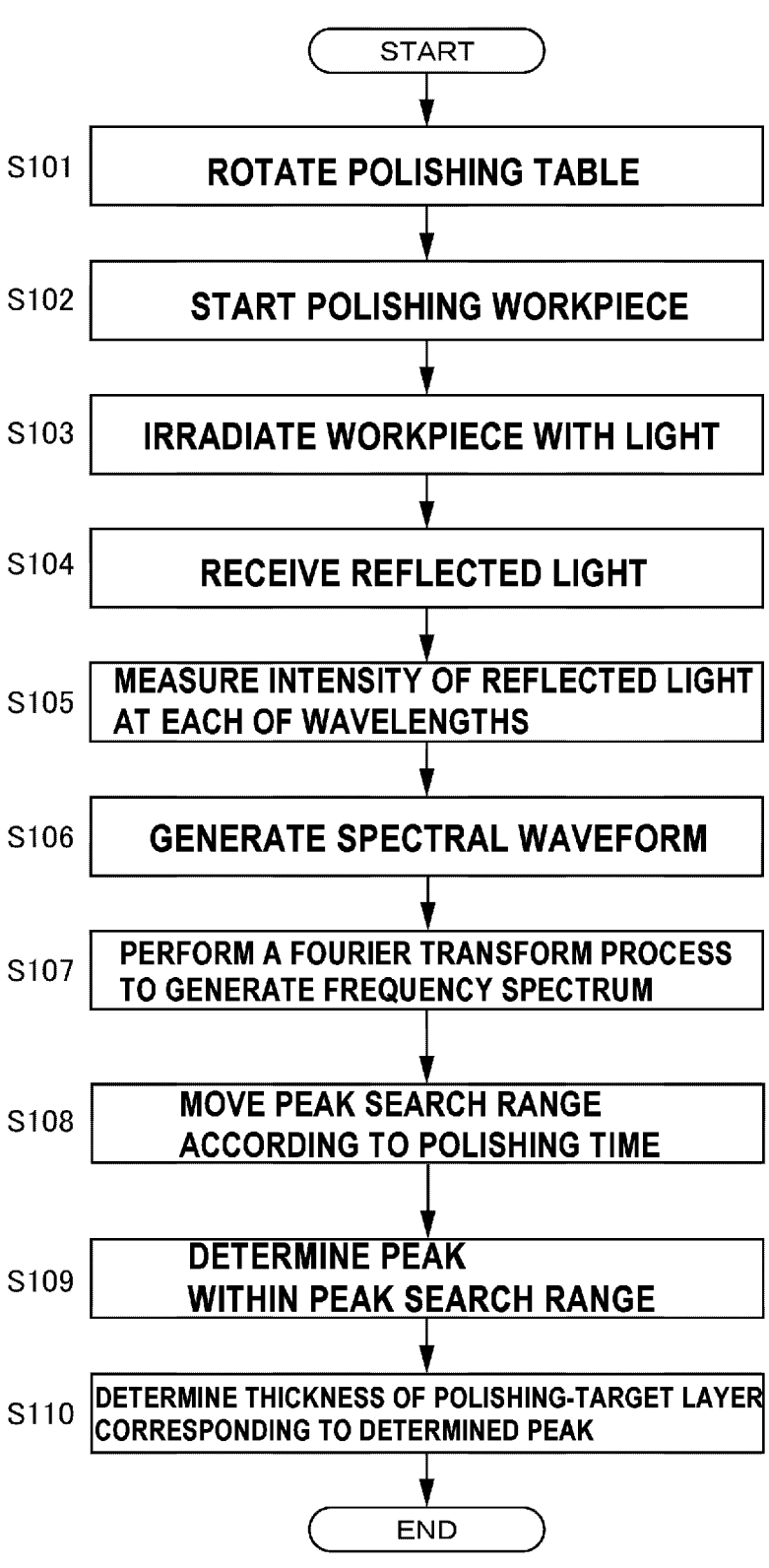
FIG. 9 is a flow chart illustrating an example of a process of moving the peak search range and determining a thickness of a polishing-target layer.

FIG. 9 is a flow chart illustrating an example of a process of determining the thickness of the polishing-target layer while moving the peak search range.

In step S101, the table motor 6 rotates the polishing table 3 supporting the polishing pad 2.

In step S102, the polishing head 1 presses the workpiece W against the polishing surface 2a of the polishing pad 2 to start polishing the workpiece W. As described with reference to FIG. 1, while the workpiece W is rotated by the polishing head 1, the workpiece W is pressed by the polishing head 1 against the polishing surface 2a of the polishing pad 2 in the presence of the polishing liquid on the polishing pad 2.

Next, during polishing of the workpiece W, the thickness of the polishing-target layer is measured by the optical film-thickness measuring device 40.

In step S103, the light source 44 emits the light, and irradiates the surface of the workpiece W with the light from the optical sensor head 7.

In step S104, the optical sensor head 7 receives the reflected light from the workpiece W.

In step S105, the spectrometer 47 measures the intensity of the reflected light from the workpiece W at each wavelength.

In step S106, the polishing controller 49 generates the spectral waveform from the intensity measurement data of the reflected light.

In step S107, the polishing controller 49 performs a Fourier transform process on the spectral waveform to generate the frequency spectrum.

In step S108, the polishing controller 49 moves the peak search range according to the polishing time. The peak search range is moved by the method that calculates the peak search range as described with reference to FIG. 8.

In step S109, the polishing controller 49 determines the peak of the frequency spectrum existing within the peak search range.

In step S110, the polishing controller 49 determines the thickness of the polishing-target layer corresponding to the determined peak.

The polishing controller 49 operates according to instructions contained in the program electrically stored in the memory 49a. Specifically, the polishing controller 49 performs the steps of: instructing the table motor 6 to rotate the polishing table 3 supporting the polishing pad 2 (see step S101); instructing the polishing head 1 to start polishing of the workpiece W (see step S102); instructing the light source 44 to emit the light to the workpiece W (see step S103); generating the spectral waveform from the intensity measurement data of the reflected light from the workpiece W (see step S106); performing a Fourier transform process on the spectral waveform to generate the frequency spectrum (see step S107); moving the peak search range according to the polishing time (see step S108); determining the peak of the frequency spectrum within the peak search range (see step S109); and determining the thickness of the polishing-target layer corresponding to the determined peak (see step S110).

The program for causing the polishing controller 49 to perform these steps is stored in a computer-readable storage medium which is a non-transitory tangible medium, and is provided to the polishing controller 49 via the storage medium. Alternatively, the program may be input to the polishing controller 49 via a communication network, such as the Internet or a local area network.

Next, an embodiment of accurately determining the thickness of the polishing-target layer by removing the noise by a filter will be described.

Figure 10:
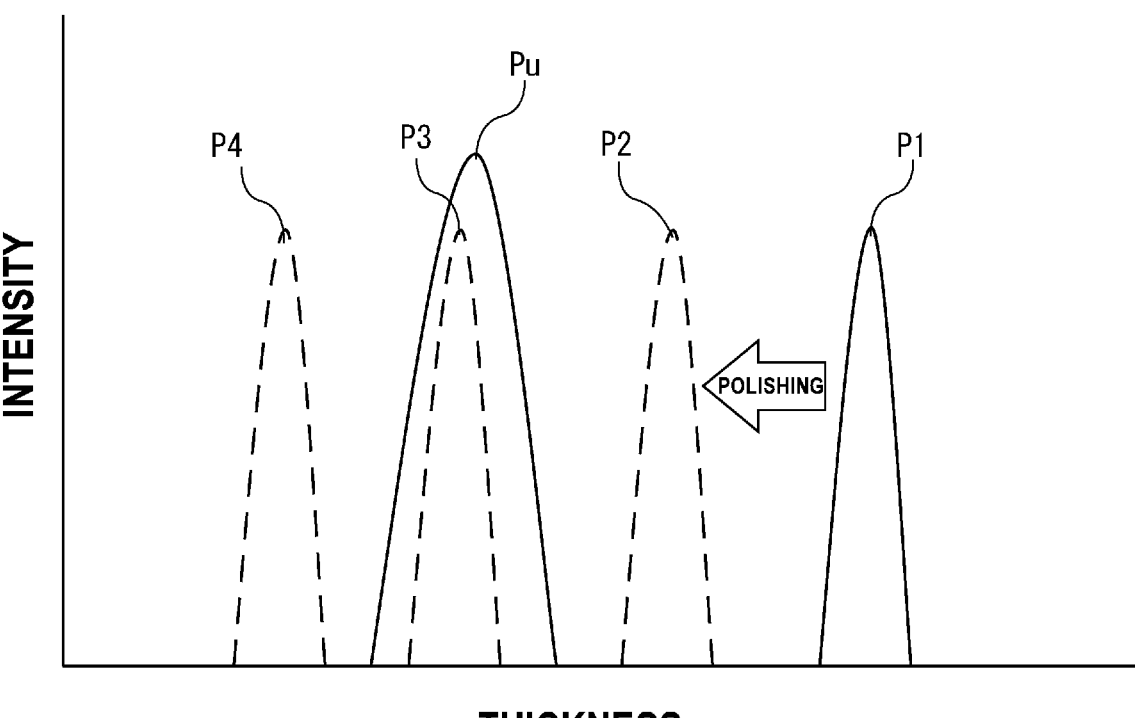
FIG. 10 is a diagram showing a frequency spectrum before filtering.

FIG. 10 is a diagram showing a frequency spectrum before filtering. In FIG. 10, vertical axis represents the intensity of the frequency component contained in the spectral waveform, and horizontal axis represents the thickness of the polishing-target layer. Each of the plurality of frequency spectra shown in FIG. 10 is generated by the polishing controller 49 each time the polishing table 3 makes one rotation during polishing of the workpiece W. A peak P1 is a peak appearing in the Nth measurement (when the polishing table 3 is in the Nth rotation), a peak P2 is a peak appearing in the N+1st measurement (when the polishing table 3 is in the N+1st rotation), a peak P3 is a peak appearing in the N+2nd measurement (when the polishing table 3 is in the N+2nd rotation), and a peak P4 is a peak appearing in the N+3rd measurement (when the polishing table 3 is in the N+3rd rotation). In FIG. 10, peaks having small intensity of frequency component are omitted. The reference numeral N is a natural number, e.g., 1.

The thickness of the polishing-target layer is determined by the optical film-thickness measuring device 40 based on the peak of the frequency component each time the polishing table 3 makes one rotation. However, due to an influence of noises caused by the lower layer lying under the polishing-target layer, it may not be possible to accurately determine the thickness of the polishing-target layer. In FIG. 10, a lower-layer peak Pu is a peak caused by the reflected light from the lower layer existing beneath the polishing-target layer, and this lower-layer peak Pu is a noise unnecessary for determining the thickness of the polishing-target layer. Since the lower layer is not polished during polishing of the workpiece W, a position of the lower-layer peak Pu does not change with a progress of polishing of the polishing-target layer. In the example shown in FIG. 10, since the lower-layer peak Pu appears at a position overlapping the peak P3, the polishing controller 49 cannot correctly determine the thickness of the polishing-target layer corresponding to the peak P3.

Thus, in the present embodiment, the polishing controller 49 uses a filter to remove the noise caused by the lower layer from the spectral waveform of the reflected light from the workpiece W. Further, the polishing controller 49 determines a thickness of the polishing-target layer by a complement that extrapolates a thickness of the polishing-target layer corresponding the peak of the frequency spectrum disappeared as a result of the removal of the noise.

The filter for removing the noise from the spectral waveform of the reflected light is produced in advance as follows. Before polishing of the workpiece W, other workpiece W' having the same pattern as the workpiece W is polished. During polishing of the other workpiece W', a thickness of a polishing-target layer is measured by the optical film-thickness measuring device 40. The polishing controller 49 determines a lower-layer peak, which is a noise, based on a frequency spectrum generated from a spectral waveform of the reflected light from the other workpiece W', and produces the filter for removing the determined noise. Specifically, the polishing controller 49 determines a peak of the frequency spectrum that does not move with the polishing time of the other workpiece W', and produces the filter for removing a component (noise) having a frequency of the determined peak from the spectral waveform of the reflected light. The filter is a digital filter, e.g., a band stop filter.

In one embodiment, without using the other workpiece W' having the same pattern as the workpiece W, the polishing controller 49 may produce the filter by determining the lower-layer peak, which is the noise, during an initial stage of polishing of the workpiece W. Specifically, during polishing of the workpiece W, the polishing controller 49 determines the peak of the frequency spectrum that does not move with the polishing time, and produces the filter for removing a component (noise) having a frequency of the determined peak from the spectral waveform of the reflected light.

Figure 11:
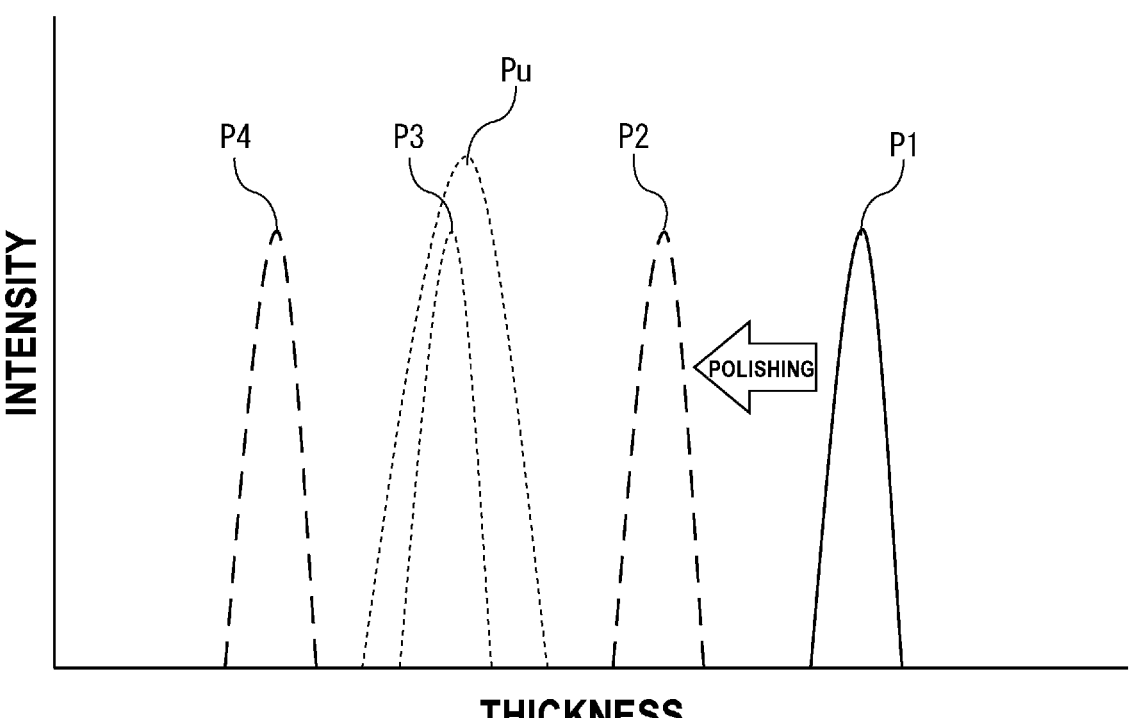
FIG. 11 is a diagram showing a frequency spectrum after filtering.

FIG. 11 is a diagram showing a frequency spectrum after filtering. The polishing controller 49 removes the noise by applying the filter produced in advance to the spectral waveform of the reflected light from the workpiece W. The plurality of frequency spectra shown in FIG. 11 are frequency spectra generated by the polishing controller 49 by performing a Fourier transform process (or a fast Fourier transform process) on the spectral waveform after removing the noise. As a result of removing the noise from the spectral waveform of the reflected light, the peak P3 at the overlapped position with the lower-layer peak Pu has also disappeared along with the lower-layer peak Pu. Therefore, the polishing controller 49 cannot accurately determine the thickness of the polishing-target layer corresponding to the peak P3.

Figure 12:
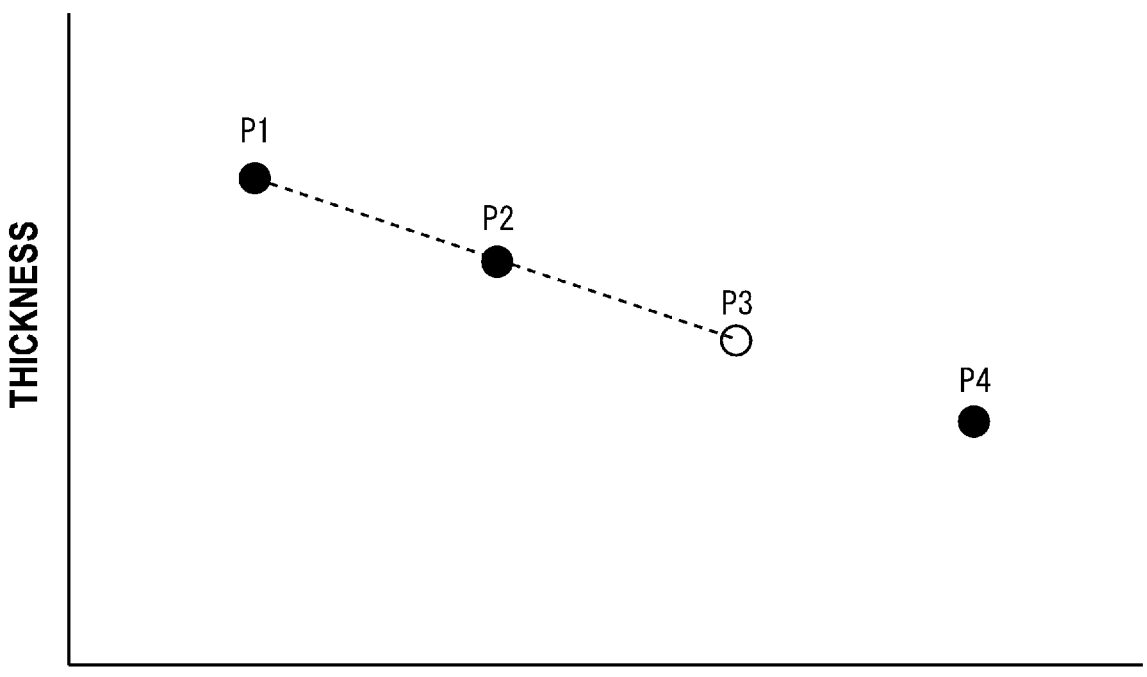
FIG. 12 is a diagram illustrating an extrapolation for a disappeared peak.

Thus, the polishing controller 49 is configured to complement the thickness of the polishing-target layer corresponding to the peak P3 by extrapolation. FIG. 12 is a diagram illustrating the extrapolation for the disappeared peak P3. In FIG. 12, peaks P1 to P4 correspond to the same reference numerals shown in FIGS. 10 and 11, and the graph shown in FIG. 12 shows the relationship between the polishing time and a thickness corresponding to each of the peaks. As described with reference to FIG. 11, when the peak P3 has disappeared as a result of the removal of the lower-layer peak Pu which is the noise, the polishing controller 49 complements a thickness of the polishing-target layer corresponding to the disappeared peak P3 by the extrapolation using values of the thickness of the polishing-target layer corresponding to the peak P1 and the peak P2. FIGS. 10 to 12 describe the case where the peak P3 has disappeared, but the present invention is not limited to this case. As long as a plurality of values of the thickness of the polishing-target layer are obtained during polishing of the workpiece W, the thickness of the polishing-target layer can be complemented by the extrapolation using the plurality of values obtained.

In the embodiment described above, the peak (noise) that does not change with the polishing time is caused by the lower layer existing under the polishing-target layer, but the present invention is not limited to this embodiment. For example, a peak (noise) that does not change with the polishing time may be a noise inherent in a device, such as the light source 44 or the spectrometer 47.

FIG. 13 is a flow chart illustrating an example of a process of removing the noise by the filter.

In step S201, the polishing apparatus polishes other workpiece W' having the same pattern as the workpiece W to be polished.

In step S202, the polishing controller 49 measures the thickness of the polishing-target layer by the optical film-thickness measuring device 40 during polishing of the other workpiece W'. The polishing controller 49 performs a Fourier transform process on the spectral waveform produced from the reflected light from the other workpiece W' to produce the frequency spectrum. The processes in the steps S201 to S202 are the same as the processes in the steps S101 to S107 in FIG. 9.

In step S203, the polishing controller 49 determines a peak of the frequency spectrum that does not change with the polishing time.

In step S204, the polishing controller 49 produces the filter for removing the noise having the frequency of the determined peak from the spectral waveform of the reflected light from the other workpiece W'.

In step S205, the polishing apparatus starts polishing the workpiece W which is an object to be polished.

In step S206, the thickness of the polishing-target layer is measured by the optical film-thickness measuring device 40 during polishing of the workpiece W. The polishing controller 49 removes the noise from the spectral waveform of the reflected light from the workpiece W by the filter created in the step S204. The processes in the steps S205 to S206 for producing the spectral waveform are the same as the processes in the steps S101 to S106 in FIG. 9.

In step S207, the polishing controller 49 performs a Fourier transform process on the spectral waveform from which the noise has been removed to generate the frequency spectrum.

In step S208, the polishing controller 49 determines the thickness of the polishing-target layer based on the peak of the frequency spectrum.

In step S209, the polishing controller 49 complements, by the extrapolation, the thickness of the polishing-target layer corresponding to the peak of the frequency spectrum that has disappeared as a result of the removal of the noise.

The polishing controller 49 operates according to instructions contained in the program electrically stored in the memory 49a. Specifically, the polishing controller 49 performs the steps of; instructing the table motor 6 to rotate the polishing table 3 supporting the polishing pad 2; instructing the polishing head 1 to start polishing the workpiece W (see step S205); instructing the light source 44 to irradiate the workpiece W with the light; generating the spectral waveform from the intensity measurement data of the reflected light from the workpiece W; removing the noise from the spectral waveform by the filter (see step S206); performing a Fourier transform process on the spectral waveform from which the noise has been removed to generate the frequency spectrum (see step S207); determining the thickness of the polishing-target layer from the peak of the frequency spectrum (see step S208); and complementing, by the extrapolation, a thickness of the polishing-target layer corresponding to the peak of the frequency spectrum that has disappeared as a result of the removal of the noise (see step S209).

The program for causing the polishing controller 49 to perform these steps is stored in a computer-readable storage medium which is a non-transitory tangible medium, and is provided to the polishing controller 49 via the storage medium. Alternatively, the program may be input to the polishing controller 49 via a communication network, such as the Internet or a local area network.

The embodiments described with reference to FIGS. 6 to 9 and the embodiments described with reference to FIGS. 10 to 13 may be combined. Specifically, the noise may be removed from the spectral waveform by the filter to generate a frequency spectrum, and the thickness of the polishing-target layer may be determined while moving the peak search range for the frequency spectrum.

Figure 14:
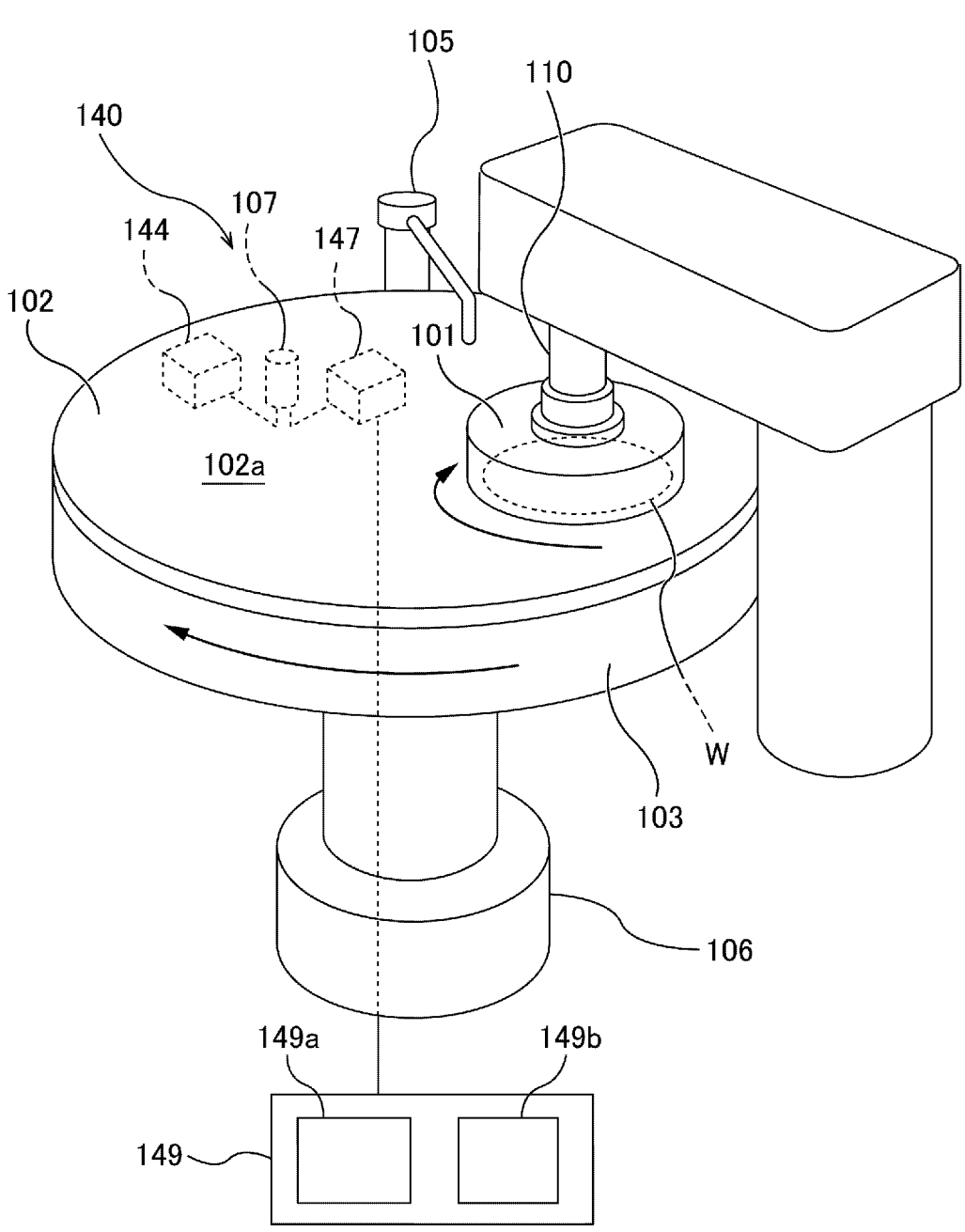
FIG. 14 is a schematic diagram showing an embodiment of a polishing apparatus.

FIG. 14 is a schematic diagram showing an embodiment of a polishing apparatus. As shown in FIG. 14, the polishing apparatus includes a polishing table 103 configured to support a polishing pad 102, a polishing head 101 configured to press a workpiece W, such as a wafer, a substrate, or a panel, having a polishing-target layer against the polishing pad 102, a table motor 106 configured to rotate the polishing table 103, and a polishing-liquid supply nozzle 105 configured to supply a polishing liquid, such as a slurry, onto the polishing pad 102. The upper surface of the polishing pad 102 constitutes a polishing surface 102a for polishing the workpiece W.

The polishing head 101 is coupled to a head shaft 110, and the head shaft 110 is coupled to a polishing-head motor (not shown). The polishing-head motor is configured to rotate the polishing head 101 together with the head shaft 110 in a direction indicated by an arrow. The polishing table 103 is coupled to the table motor 106, and the table motor 106 is configured to rotate the polishing table 103 and the polishing pad 102 in a direction indicated by an arrow.

Polishing of the workpiece W is performed as follows. The polishing-liquid supply nozzle 105 supplies the polishing liquid onto the polishing surface 102a of the polishing pad 102 on the polishing table 103, while the polishing table 103 and the polishing head 101 are rotated in directions indicated by the arrows in FIG. 14. While the workpiece W is being rotated by the polishing head 101, the workpiece W is pressed by the polishing head 101 against the polishing surface 102a of the polishing pad 102 in the presence of the polishing liquid on the polishing pad 102. The polishing-target layer constituting an exposed surface of the workpiece W is polished by a chemical action of the polishing liquid and a mechanical action of abrasive grains contained in the polishing liquid, and the polishing pad 102. Examples of the polishing-target layer of the workpiece W include, but are not limited to, an insulating film and a silicon layer.

The polishing apparatus includes an optical polishing-monitoring device 140 configured to monitor the polishing of the workpiece W. The optical polishing-monitoring device 140 includes a light source 144 configured to emit light, a spectrometer 147, an optical sensor head 107 optically connected to the light source 144 and the spectrometer 147, and a data processor 149 coupled to the spectrometer 147. The optical sensor head 107, the light source 144, and the spectrometer 147 are secured to the polishing table 103, and rotate together with the polishing table 103 and the polishing pad 102. The position of the optical sensor head 107 is such that the optical sensor head 107 sweeps across the workpiece W on the polishing pad 102 each time the polishing table 103 and the polishing pad 102 make one rotation.

The data processor 149 includes a memory 149a storing programs therein for generating a spectrum and monitoring polishing of the workpiece W, which will be described later, and an arithmetic device 149b for performing arithmetic operations according to instructions included in the programs. The data processor 149 is composed of at least one computer. The memory 149a includes a main memory, such as RAM, and an auxiliary memory, such as a hard disk drive (HDD) or a solid state drive (SSD). Examples of the processing device 149b include a CPU (central processing unit) and a GPU (graphic processing unit). However, the specific configurations of the data processor 149 are not limited to these examples.

The light emitted by the light source 144 is transmitted to the optical sensor head 107, and is directed from the optical sensor head 107 to the workpiece W. The light is reflected off the workpiece W, and the reflected light from the workpiece W is received by the optical sensor head 107 and is further transmitted to the spectrometer 147. The spectrometer 147 decomposes the reflected light according to wavelength, and measures an intensity of the reflected light at each of the wavelengths. The intensity measurement data of the reflected light is transmitted to the data processor 149.

The data processor 149 is configured to produce a spectrum of the reflected light from the intensity measurement data of the reflected light. This spectrum of the reflected light is expressed as a line graph (i.e., a spectral waveform) indicating a relationship between the wavelength and the intensity of the reflected light. The intensity of the reflected light can also be represented by a relative value, such as a reflectance or a relative reflectance.

Figure 15:
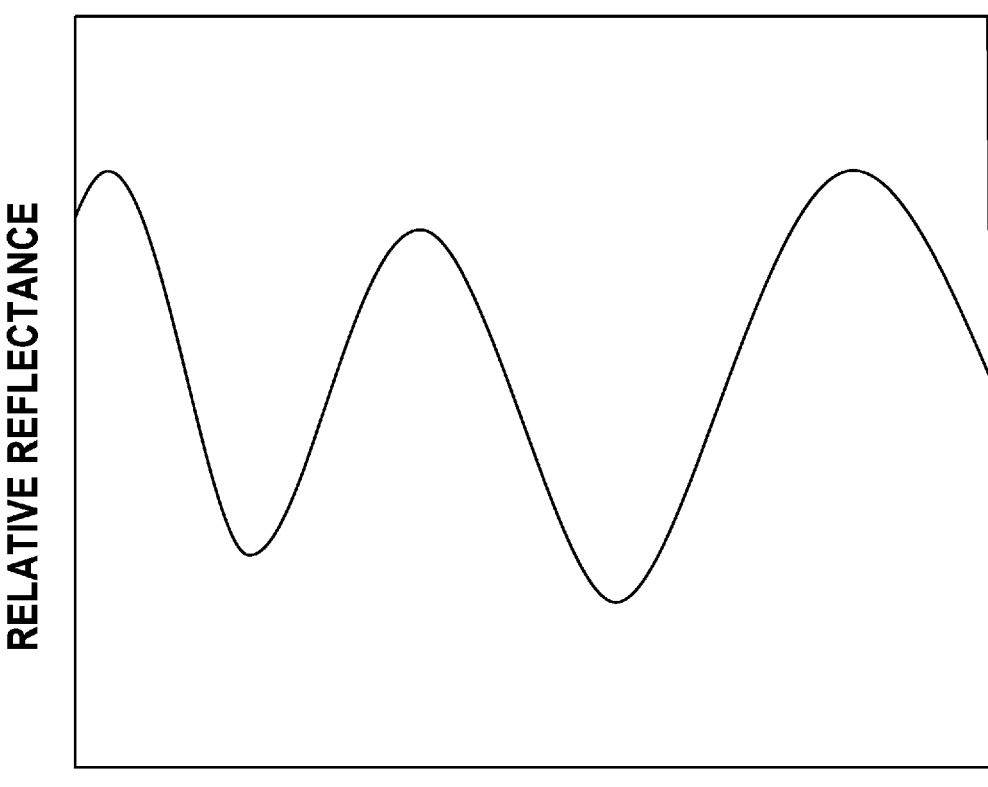
FIG. 15 is a diagram showing an example of a spectrum generated by a data processor.

FIG. 15 is a diagram showing an example of a spectrum generated by the data processor 149. The spectrum is represented as a line graph (i.e., a spectral waveform) showing a relationship between the wavelength and the intensity of the light. In FIG. 15, horizontal axis represents the wavelength of the reflected light from the workpiece W, and vertical axis represents a relative reflectance derived from the intensity of the reflected light. The relative reflectance is an index that represents the intensity of the reflected light. The relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity of light measured in advance at each of the wavelength. The relative reflectance is calculated at each of the wavelength. Specifically, the relative reflectance is determined by dividing the intensity of the light (the actual intensity) at each wavelength by the corresponding reference intensity. The reference intensity is obtained by directly measuring the intensity of light emitted from the optical sensor head 107, or by irradiating a mirror with light from the optical sensor head 107 and measuring an intensity of reflected light from the mirror. Alternatively, the reference intensity may be an intensity of reflected light from a silicon substrate (bare substrate) with no film thereon measured by the spectrometer 147 when the silicon substrate is being water-polished on the polishing pad 102 in the presence of water, or when the silicon substrate (bare substrate) is placed on the polishing pad 102.

In the actual polishing process, a dark level (which is a background intensity obtained under the condition that the light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is, the relative reflectance $R(\lambda)$ can be calculated by using $$R(\lambda) = \frac{E(\lambda) - D(\lambda)}{B(\lambda) - D(\lambda)} \tag{4}$$

where, $\lambda$ is wavelength of the reflected light from the workpiece W, $E(\lambda)$ is the intensity at the wavelength $\lambda$, $B(\lambda)$ is the reference intensity at the wavelength $\lambda$, and $D(\lambda)$ is the background intensity (i.e., dark level) at the wavelength $\lambda$ measured under the condition that the light is cut off.

Each time the polishing table 103 makes one rotation, the optical sensor head 107 directs the light to a plurality of measurement points on the workpiece W while moving across the workpiece W, and receives the reflected light from the plurality of measurement points. The reflected light is transmitted to the spectrometer 147. The spectrometer 147 decomposes the reflected light from each of the measurement points according to the wavelength, and measures the intensity of the reflected light at each of the wavelengths. The intensity measurement data of the reflected light is transmitted to the data processor 149, and the data processor 149 produces a spectrum as shown in FIG. 15 from the intensity measurement data of the reflected light. In the example shown in FIG. 15, the spectrum of the reflected light is a spectral waveform showing the relationship between the relative reflectance and the wavelength of the reflected light. The spectrum of the reflected light may be a spectral waveform showing a relationship between the intensity itself of the reflected light and the wavelength of reflected light.

The spectrum of the reflected light changes according to the thickness of the polishing-target layer of the workpiece W. The data processor 149 monitors the polishing of the workpiece W based on the spectrum of the reflected light as follows. The data processor 149 calculates an amount of change in the spectrum $\Delta S(T)$ per unit time by using $$\Delta S(T) = \sum_{\lambda = \lambda 1}^{\lambda 2} |R(\lambda, T + \Delta T) - R(\lambda, T)| \tag{5}$$

where, $\lambda$ is a wavelength of the reflected light, $\lambda 1$ and $\lambda 2$ are a minimum wavelength and a maximum wavelength that define a wavelength range of the spectrum to be monitored, T is a polishing time, $\Delta T$ is a predetermined unit time, and $R(\lambda, T)$ is a relative reflectance (or an intensity of the reflected light) at a wavelength $\lambda$ and a time T. $\Delta T$ may be, for example, a time required for the polishing table to rotate p time(s), where p is a small natural number (e.g., 1).

Figure 16:
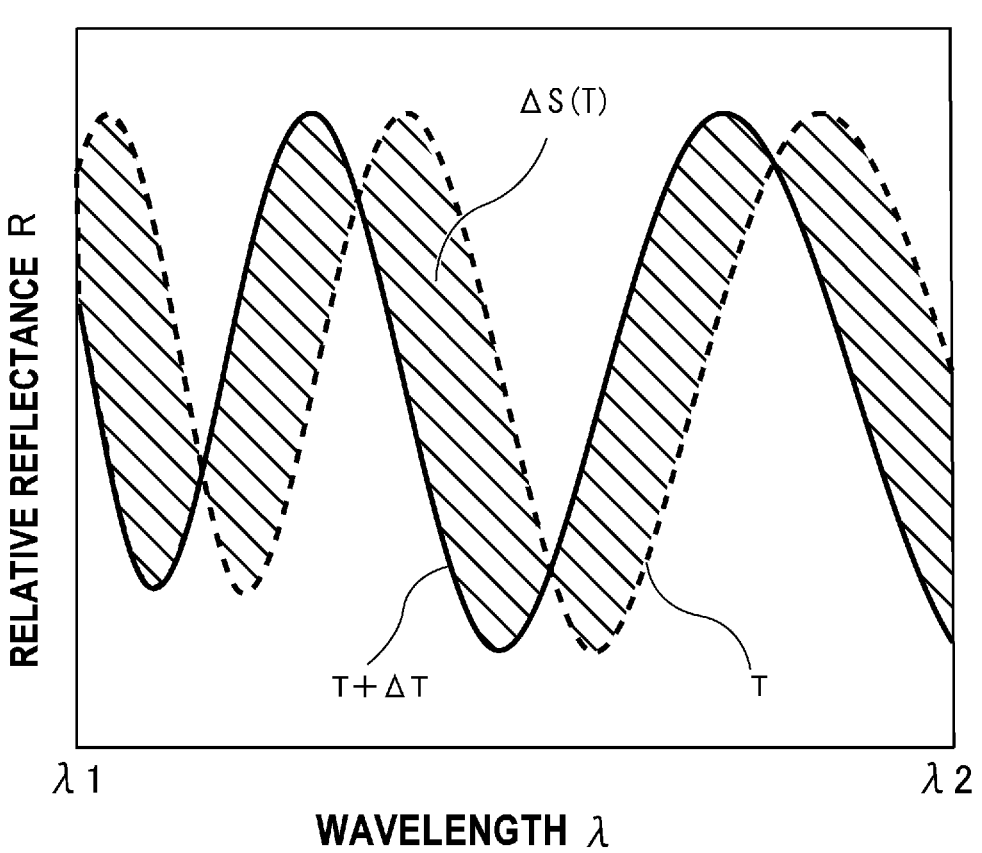
FIG. 16 is a diagram showing a change in the spectrum during a unit time.

FIG. 16 is a diagram showing a change in the spectrum during the unit time $\Delta T$. The amount of change in the spectrum $\Delta S(T)$ calculated by the above formula (5) corresponds to a region (shown with hatching) surrounded by two spectra obtained at two different points in time. An area of this region corresponds to the thickness of the polishing-target layer that has changed per unit time $\Delta T$. Therefore, it is expected that the change in the thickness of the polishing-target layer can be monitored by adding up amounts of change in the spectrum $\Delta S(T)$ during polishing.

Figure 17:
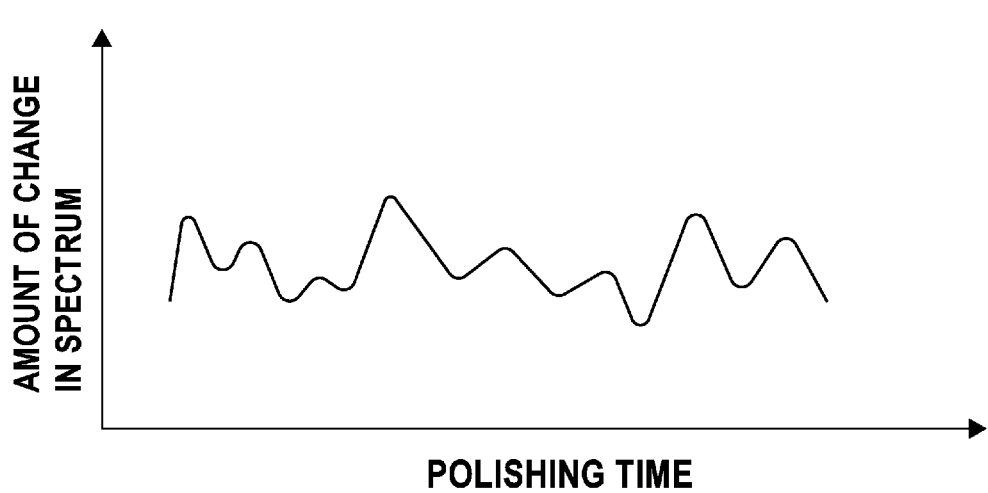
FIG. 17 is a graph showing a manner in which an amount of change in the spectrum varies along polishing time during polishing of a workpiece.

FIG. 17 is a graph showing the amount of change in the spectrum $\Delta S(T)$ that varies along the polishing time during polishing of the workpiece W. As shown in FIG. 17, the amount of change in the spectrum $\Delta S(T)$ fluctuates periodically, but an average level of the amount of change in the spectrum $\Delta S(T)$ is almost constant. The data processor 149 calculates a cumulative amount of change in the spectrum, which is a cumulative value of amounts of change in the spectrum $\Delta S(T)$ along the polishing time, by using $$A(T) = \sum_{T = T0}^{T} \Delta S(T) \Delta T \tag{6}$$

where, T0 is a time to start monitoring the change in the film thickness.

Figure 18:
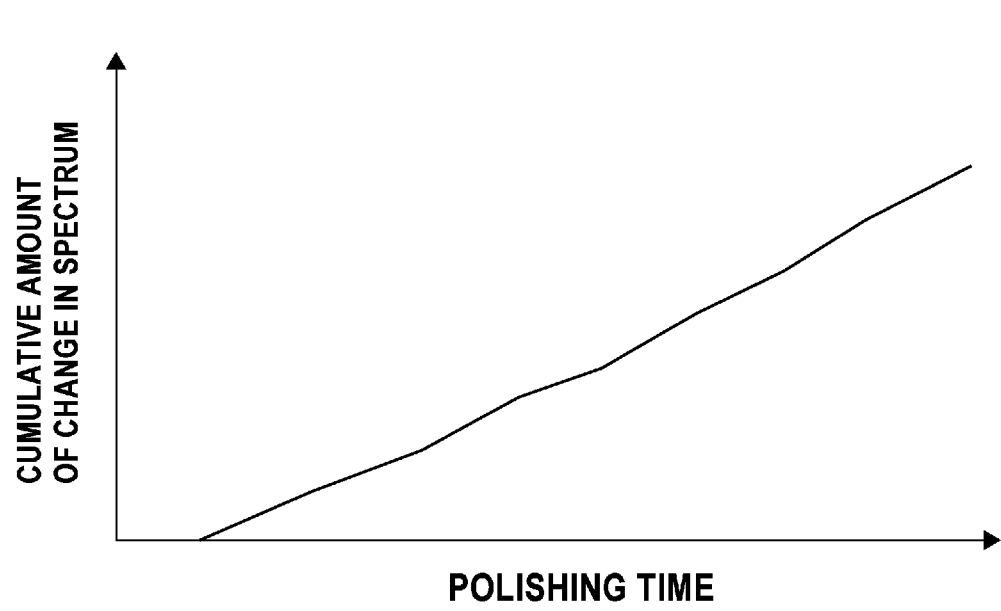
FIG. 18 is a graph showing a cumulative amount of change in the spectrum obtained by adding up amounts of change in the spectrum along the polishing time.

FIG. 18 is a graph showing the cumulative amount of change in the spectrum $A(T)$ calculated using the above formula (6). As described above, since the amount of change in the spectrum fluctuates periodically, an error from the average level due to the fluctuation is hardly accumulated. Therefore, as shown in FIG. 18, the cumulative amount of change in the spectrum $A(T)$ increases almost linearly with the polishing time. The cumulative amount of change in the spectrum $A(T)$ corresponds to an amount of polishing of the workpiece W (i.e., an amount of removal of the polishing-target layer). The above-described data processor 149 calculates the cumulative amount of change in the spectrum during polishing of the workpiece W, and monitors a progress of the polishing of the workpiece W based on the cumulative amount of change in the spectrum. In addition, the data processor 149 may determine a polishing end point of the workpiece W based on the cumulative amount of change in the spectrum. The polishing end point can be a point of time when the cumulative amount of change in the spectrum reaches a predetermined target value.

Figure 23:
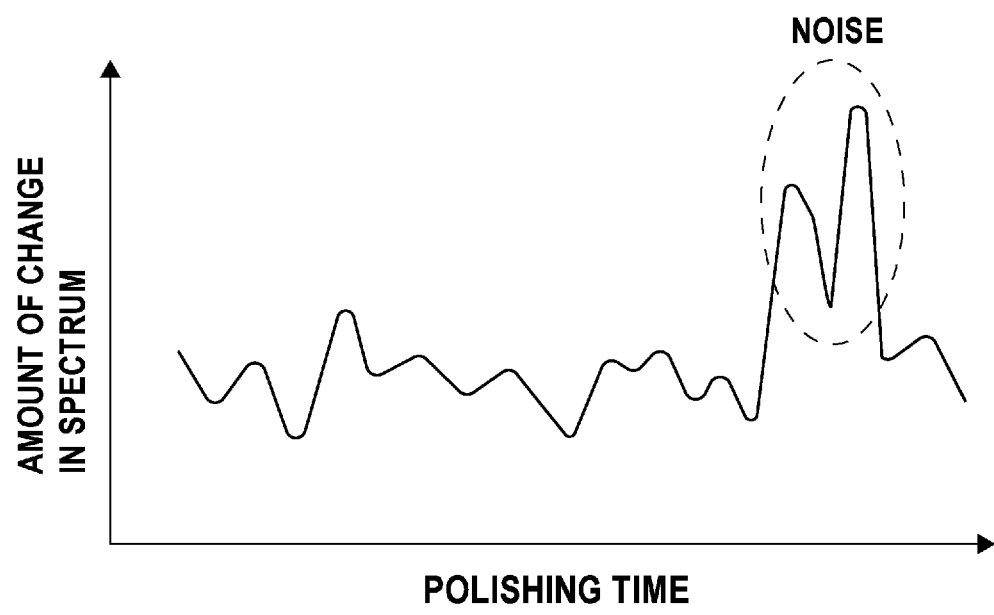
FIG. 23 is a graph showing a relationship between an amount of change in the spectrum containing a local noise and the polishing time.

As described with reference to FIG. 23, a local noise may be added to the amount of change in the spectrum due to an influence of the pattern formed on the surface of the workpiece W, an influence of a polishing environment (e.g., slurry), or the like. Such noise may prevent accurate monitoring of the polishing of the workpiece W.

Figure 19A:
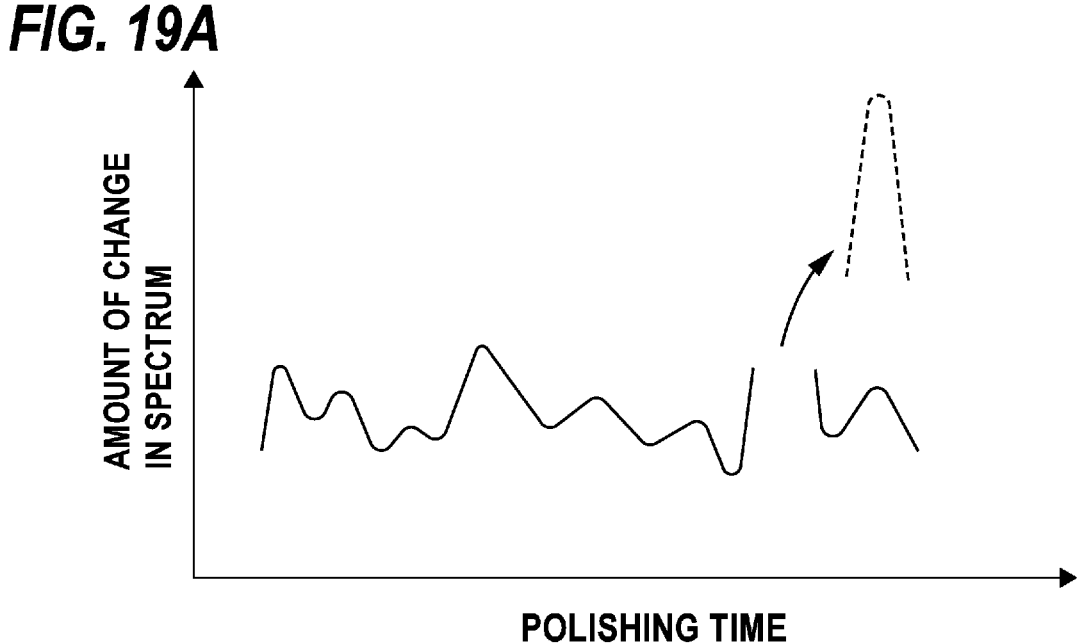
FIG. 19A is a graph in which an amount of change in the spectrum containing a noise has been removed.
Figure 19B:
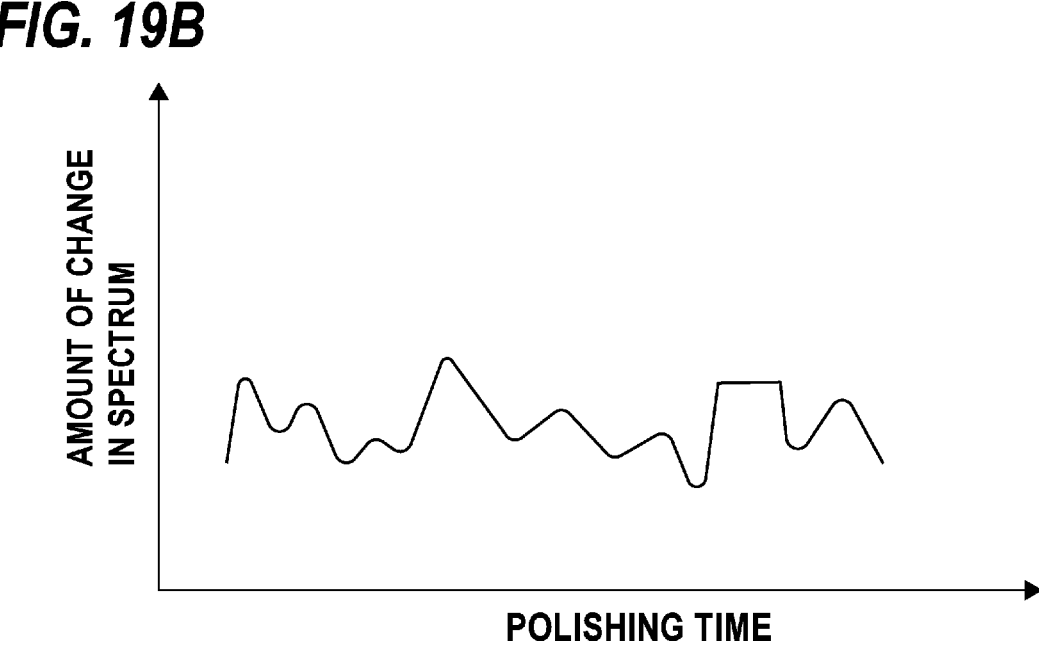
FIG. 19B is a graph in which the amount of change in the spectrum missing as a result of removal is replaced with an amount of change in the spectrum containing no noise.

Thus, the data processor 149 is configured to correct the amount of change in the spectrum to which the noise is added. Specifically, as shown in FIG. 19A, the data processor 149 is configured to remove an amount of change in the spectrum containing a noise. As shown in FIG. 19B, the data processor 149 is further configured to replace the amount of change in the spectrum that is missing due to the removal with an amount of change in the spectrum containing no noise. More specifically, the data processor 149 is configured to correct an amount of change in the spectrum, when that amount of change in the spectrum satisfies a predetermined exclusion condition. The data processor 149 is configured to calculate the cumulative amount of change in the spectrum by adding up amount(s) of change in the spectrum that does not satisfy the exclusion condition, and the corrected amount of change in the spectrum, along the polishing time.

The predetermined exclusion condition is a condition for determining that the noise is contained in the calculated amount of change in the spectrum. Specific examples of the predetermined exclusion condition include the following:

(i) the amount of change in the spectrum is larger than a threshold value;

(ii) a difference between a current amount of change in the spectrum and an average value of a plurality of amounts of change in the spectrum that have already been obtained during polishing of the workpiece W is larger than a threshold value;

(iii) the amount of change in the spectrum is outside a range defined by an average value$\pm Z\sigma$ (Z is a predetermined coefficient), wherein the average value is an average value of a normal distribution of a plurality of amounts of change in the spectrum obtained in the past; and (iv) the amount of change in the spectrum is determined to be an outlier by Smirnov-Grabs test.

With respect to the above (i), the threshold value is a preset fixed value and is determined based on data of the amount of change in the spectrum obtained in the past. For example, the threshold value is a value that can significantly divide the data of the amount of change in the spectrum obtained in the past into a group of amounts of change in the spectrum that do not contain noise and a group of amounts of change in the spectrum that contain noise.

With respect to the above (ii), the plurality of amounts of change in the spectrum that have already been obtained during polishing of the workpiece W are, for example, latest L amounts of change in spectrum that do not include the current amount of change in the spectrum. The number L is a preset value. When the difference between the current amount of change in the spectrum and the average value of the plurality of amounts of change in the spectrum already obtained is larger than the threshold value, the current amount of change in the spectrum is likely to contain the noise. This threshold value may be a fixed value. Alternatively, the threshold value may be a value that fluctuates according to the above-described average value. For example, the threshold value may be a value deviating from the above-described average value by a predetermined percentage (%).

With respect to the above (iii), the plurality of amounts of change in the spectrum obtained in the past may be a plurality of amounts of change in the spectrum obtained while at least one workpiece having the same structure as the workpiece W was being polished, or may be a plurality of amounts of change in the spectrum already obtained during polishing of the workpiece W.

With respect to the above (iv), a sample data used in the Smirnov-Grabs test may be a plurality of amounts of change in the spectrum obtained while at least one workpiece having the same structure as the workpiece W was being polished, or may be a plurality of amounts of change in the spectrum already obtained during polishing of the workpiece W.

The amount of change in the spectrum satisfying any one of the above exclusion conditions (i) to (iv) is presumed to contain the noise. The data processor 149 corrects the amount of change in the spectrum when that amount of change in the spectrum calculated during polishing of the workpiece W satisfies any one of the above exclusion conditions. The correction of the amount of change in the spectrum is a process of removing the noise. The exclusion condition may be one selected in advance from the above exclusion conditions (i) to (iv).

In one embodiment, the data processor 149 corrects the amount of change in the spectrum satisfying the exclusion condition by extrapolation or interpolation. More specifically, the data processor 149 excludes the amount of change in the spectrum satisfying the exclusion condition (i.e., containing the noise), and determines an amount of change in the spectrum by extrapolation or interpolation. This determined amount of change in the spectrum corresponds to the amount of change in the spectrum excluded and does not satisfy the exclusion condition (i.e., contains no noise). The correction by the extrapolation uses a plurality of amounts of change in the spectrum aligned along the polishing time, and the correction by the interpolation uses a plurality of amounts of change in the spectrum obtained at a plurality of measurement points aligned on the workpiece W.

The data processor 149 is configured to correct the amount of change in the spectrum satisfying the exclusion condition by performing any one of the following operations:

(I) an operation of replacing the amount of change in the spectrum satisfying the exclusion condition (i.e., containing the noise) with an amount of change in the spectrum that does not satisfy the exclusion condition (i.e., contains no noise);

(II) an operation of replacing the amount of change in the spectrum satisfying the exclusion condition with an average value of a plurality of amounts of change in the spectrum already obtained during polishing of the workpiece W;

(III) an operation of replacing the amount of change in the spectrum satisfying the exclusion condition with an average value of a plurality of amounts of change in the spectrum obtained at a plurality of adjacent measurement points on the workpiece W; and (IV) an operation of generating an approximate expression from a plurality of amounts of change in the spectrum already obtained during polishing of the workpiece W and replacing the amount of change in the spectrum satisfying the exclusion condition with a value obtained by the approximate expression.

With respect to the above (I), the amount of change in the spectrum that does not satisfy the exclusion condition (i.e., contains no noise) is an amount of change in the spectrum already obtained during polishing of the workpiece W. In one embodiment, the amount of change in the spectrum that does not satisfy the exclusion condition (i.e., contains no noise) is the latest amount of change in the spectrum obtained immediately before the amount of change in the spectrum satisfying the exclusion condition is obtained.

With respect to the above (II), the plurality of amounts of change in the spectrum already obtained during polishing of the workpiece W are a plurality of amounts of change in the spectrum that do not satisfy the exclusion condition (i.e., contain no noise). In one embodiment, the plurality of amounts of change in the spectrum already obtained during polishing of the workpiece W are latest M amounts of change in the spectrum that do not include the current amount of change in the spectrum. The number M is a preset value.

With respect to the above (III), the adjacent measurement points on the workpiece W are a plurality of measurement points adjacent to a measurement point on the workpiece W at which the amount of change in the spectrum satisfying the exclusion condition has been obtained. As described above, each time the polishing table 103 makes one rotation, the optical sensor head 107 directs the light to the plurality of measurement points on the workpiece W while moving across the workpiece W, and receives the reflected light from the plurality of measurement points. The adjacent measurement points on the workpiece W may be, for example, a plurality of measurement points located at both sides of the measurement point at which the amount of change in the spectrum satisfying the exclusion condition (i.e., containing the noise) has been obtained. The amounts of change in the spectrum obtained at the adjacent measurement points, respectively, are amounts of change in the spectrum that do not satisfy the exclusion condition (i.e., contain no noise).

Figure 20:
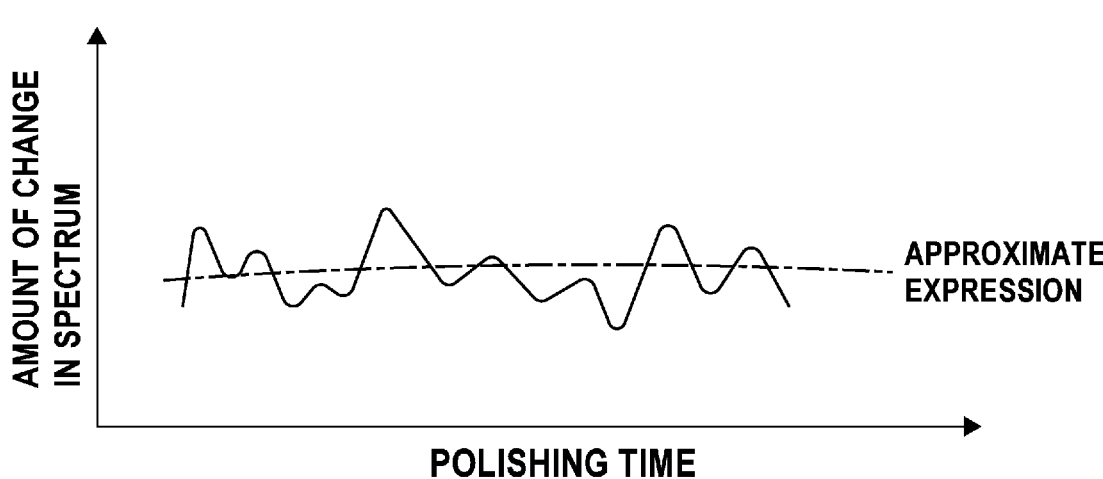
FIG. 20 is a diagram showing an approximate expression generated from a plurality of amounts of change in the spectrum obtained during polishing of the workpiece.
Figure 21:
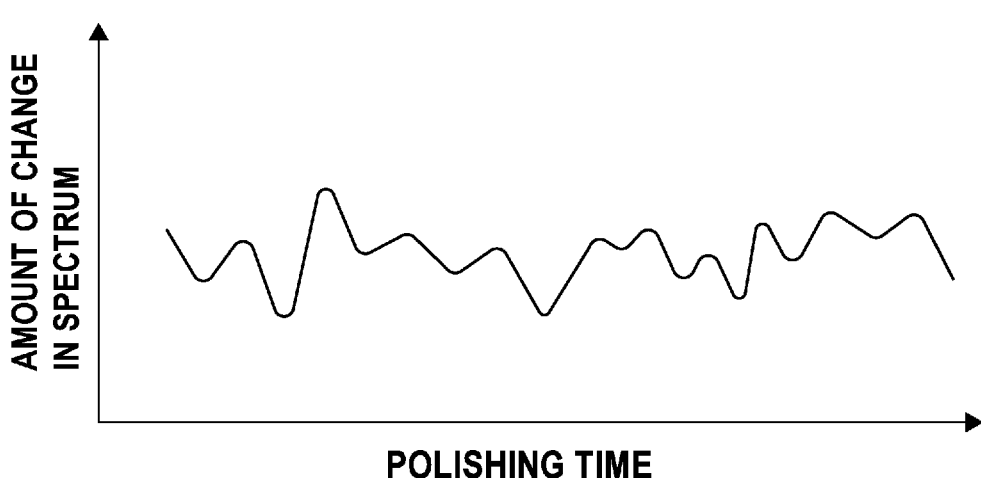
FIG. 21 is a graph showing a relationship between the amount of change in the spectrum and the polishing time.
Figure 22:
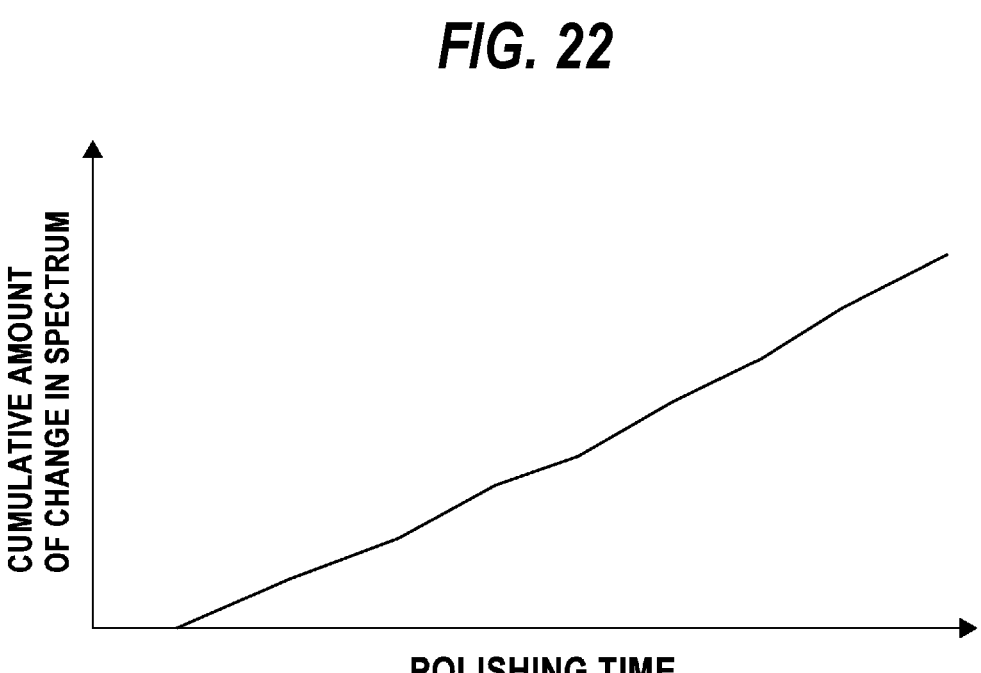
FIG. 22 is a graph showing the cumulative amount of change in the spectrum obtained by adding up amounts of change in the spectrum along the polishing time.

With respect to the above (IV), the approximate expression is an expression on a coordinate system having coordinate axes representing the amount of change in the spectrum and the polishing time, as shown in FIG. 20. The approximate expression has the polishing time as a variable. The approximate expression is determined from a plurality of data points on the coordinate system specified by a plurality of amounts of change in the spectrum that do not satisfy the exclusion condition (i.e., contain no noise) and the corresponding polishing times. The approximate expression may be represented by a polynomial. The way of determining the approximate expression is not particularly limited. The data processor 149 generates the approximate expression during polishing of the workpiece W, and inputs a polishing time at which an amount of change in the spectrum satisfying the exclusion condition (i.e., containing the noise) is obtained into the approximate expression. As a result, the data processor 149 can correct the amount of change in the spectrum.

The data processor 149 calculates the cumulative amount of change in the spectrum by adding up the amount(s) of change in the spectrum that does not satisfy the exclusion condition (i.e., does not contain noise) and the corrected amount of change in the spectrum, along the polishing time. The data processor 149 monitors an amount of polishing of the workpiece W based on the cumulative amount of change in the spectrum. Since the cumulative amount of change in the spectrum is a cumulative value of the amounts of change in the spectrum that do not contain the noise, the data processor 149 can accurately monitor the amount of polishing of the workpiece W.

The above description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A polishing method for polishing a polishing-target layer of a workpiece, comprising:
    rotating a polishing table supporting a polishing pad;
    irradiating the workpiece with light;
    receiving reflected light from the workpiece during polishing;
    measuring an intensity of the reflected light at each of a plurality of wavelengths;
    generating a spectral waveform showing a relationship between the intensity and wavelength of the reflected light;
    performing a Fourier transform process on the spectral waveform to generate a frequency spectrum;
    moving a peak search range along a thickness axis of the frequency spectrum as a function of a polishing time to allow the peak search range to follow a change in thickness of the polishing-target layer;
    determining a peak of the frequency spectrum within the peak search range;
    determining a thickness of the polishing-target layer corresponding to the determined peak to detect an endpoint for polishing the target layer; and
    polishing the target layer of the workpiece based on the determined thickness by pressing the workpiece against the polishing pad.

2. The polishing method according to claim 1, wherein the peak search range is a range that includes a value calculated based on a thickness of the polishing-target layer determined last time and a polishing rate of the workpiece.

3. The polishing method according to claim 2, wherein the polishing rate is a preset polishing rate.

4. The polishing method according to claim 2, wherein the polishing rate is a polishing rate calculated during polishing of the workpiece.

5. The polishing method according to claim 2, wherein the value is calculated from the thickness of the polishing-target layer determined last time, the polishing rate, and a time interval at which the thickness of the polishing-target layer is determined.

6. The polishing method according to claim 5, wherein the peak search range has an upper limit determined by adding the calculated value to a preset value and has a lower limit determined by subtracting the preset value from the calculated value.

\* \* \* \* \*